United States Patent
Kakwani et al.

(10) Patent No.: US 6,826,906 B2
(45) Date of Patent: Dec. 7, 2004

(54) EXHAUST SYSTEM FOR ENHANCED REDUCTION OF NITROGEN OXIDES AND PARTICULATES FROM DIESEL ENGINES

(75) Inventors: Ramesh M. Kakwani, Whitehouse Station, NJ (US); Kenneth C. Voss, Somerville, NJ (US); Joseph A. Patchett, Basking Ridge, NJ (US); Karl R. Grimston, Upper Strensham (GB)

(73) Assignee: Engelhard Corporation, Iselin, NJ (US)

(*) Notice: Subject to any disclaimer, the term of this patent is extended or adjusted under 35 U.S.C. 154(b) by 127 days.

(21) Appl. No.: 09/816,912

(22) Filed: Mar. 23, 2001

(65) Prior Publication Data

US 2002/0044897 A1 Apr. 18, 2002

Related U.S. Application Data

(60) Provisional application No. 60/225,478, filed on Aug. 15, 2000.

(51) Int. Cl.[7] .................................................. F01N 3/10
(52) U.S. Cl. .............................. 60/303; 60/286; 60/295; 60/292; 60/297
(58) Field of Search .......................... 60/274, 286, 301, 60/303, 295, 297, 311

(56) References Cited

U.S. PATENT DOCUMENTS

| | | | |
|---|---|---|---|
| 4,833,113 A | | 5/1989 | Imanari et al. |
| 4,902,487 A | | 2/1990 | Cooper et al. |
| 4,912,776 A | | 3/1990 | Alcorn |
| 4,961,917 A | | 10/1990 | Byrne |
| 5,100,632 A | | 3/1992 | Dettling et al. |
| 5,516,497 A | | 5/1996 | Speronello et al. |
| 5,746,989 A | | 5/1998 | Murachi et al. |
| 5,804,155 A | | 9/1998 | Farrauto et al. |
| 5,809,774 A | * | 9/1998 | Peter-Hoblyn et al. ........ 60/274 |
| 5,974,791 A | * | 11/1999 | Hirota et al. ................. 60/276 |
| 6,051,040 A | * | 4/2000 | Peter-Hoblyn ................ 60/274 |
| 6,199,374 B1 | * | 3/2001 | Hirota et al. ................. 60/277 |
| 6,199,375 B1 | * | 3/2001 | Russell ........................ 60/286 |
| 6,233,927 B1 | * | 5/2001 | Hirota et al. ................. 60/297 |
| 6,314,722 B1 | * | 11/2001 | Matros et al. ................. 60/274 |
| 6,615,580 B1 | * | 9/2003 | Khair et al. ................... 60/286 |

FOREIGN PATENT DOCUMENTS

| | | | |
|---|---|---|---|
| EP | 0 498 598 A1 | 8/1992 | ............. F01N/3/20 |
| EP | 0 806 553 A2 | 11/1997 | ............. F01N/3/02 |
| EP | 1 054 722 B1 | 12/2001 | ........... B01D/53/94 |
| WO | WO 99/39809 | 8/1999 | |
| WO | WO 00/21647 | 4/2000 | |
| WO | WO 00/29726 | 5/2000 | ........... F01N/3/035 |

OTHER PUBLICATIONS

Publication entitled "Nitrogen Oxides Control Technology Fact Book", pp. 84–105, dated 1992, by Sloss, Hjalmarsson, Soud, Campbell, Stone, Shareef, Maibodi, Livengood, Markussen, Noyes Data Corporation, Park Ridge, NJ, USA.
SAE paper No. 930363, entitled "Off–Highway Exhaust Gas After–Treatment: Combining Urea–SCR, Oxidation Catalysis and Traps", by Hug, Mayer and Hartenstein, dated Mar. 1–5, 1993, International Congress and Exposition, Detroit, Michigan, USA.
Brochure entitled "Exhaust Gas Purification Systems", by Hug Engineering, dated 1996, pp. 2–7.
Brochure entitled "STARU—Stationary gas purification systems", by Hug Engineering, dated 1996.

* cited by examiner

Primary Examiner—Binh Q. Tran
(74) Attorney, Agent, or Firm—Richard A. Negin

(57) ABSTRACT

A diesel engine aftertreatment exhaust system uses catalyzed soot filters for particulate matter reduction and urea SCR catalysts for NOx reduction on diesel engines in a combined system to lower particulate matter and NOx at the same time. With this integral emission control system, diesel engines are able to meet ultra low emission standards.

9 Claims, 15 Drawing Sheets

EXHAUST SYSTEM FOR ENHANCED REDUCTION OF NITROGEN OXIDES AND PARTICULATES FROM DIESEL ENGINES

CROSS REFERENCE TO PATENT APPLICATION UNDER 35 USC §119

This application claims the benefit of U.S. Provisional Application No. 60/225,478, filed Aug. 15, 2000, entitled "EXHAUST SYSTEM FOR ENHANCED REDUCTION OF NITROGEN OXIDES AND PARTICULATES FROM DIESEL ENGINES".

BACKGROUND

A) Field of Invention

This invention relates generally to a diesel exhaust aftertreatment system and more particularly to a diesel exhaust treatment system that simultaneously provides for a high level reduction of nitrogen oxides (NOx) and particulate emissions under lean engine operating conditions.

B) Incorporation by Reference

The following United States patents are incorporated by reference herein and made a part hereof. Specifically, the compositions of the catalysts disclosed in the patents below and how the compositions are made and/or applied to the disclosed filter or SCR catalysts are incorporated herein so that such material need not be repeated or explained again in detail in the Detailed Description of this invention.

- U.S. Pat. No. 4,833,113 to Imanari et al., issued May 23, 1989, entitled "Denitration Catalyst for Reducing Nitrogen Oxides in Exhaust Gas";
- U.S. Pat. No. 4,961,917 to Byrne, issued Oct. 9, 1990, entitled "Method for Reduction of Nitrogen Oxides with Ammonia Using Promoted Zeolite Catalysts";
- U.S. Pat. No. 5,100,632 to Dettling et al., issued Mar. 31, 1992, entitled "Catalyzed Diesel Exhaust Particulate Filter"; and,
- U.S. Pat. No. 5,804,155 to Farrauto et al., issued Sep. 8, 1998, entitled "Basic Zeolites as Hydrocarbon Traps for Diesel Oxidation Catalysts".

While the catalysts disclosed in the patents incorporated by reference herein may be used in the present invention, they do not, per se, or, in and of themselves, form the present invention.

C) Prior Art

Compression ignition diesel engines have great utility and advantage as vehicle power plants because of their inherent high thermal efficiency (i.e. good fuel economy) and high torque at low speed. Diesel engines run at a high A/F (air to fuel) ratio under very fuel lean conditions. Because of this they have very low emissions of gas phase hydrocarbons and carbon monoxide. However, diesel exhaust is characterized by relatively high emissions of nitrogen oxides (NOx) and particulates. The particulate missions, which are measured as condensed material at 52° C., are multi phase being comprised of solid (insoluble) carbon soot particles, liquid hydrocarbons in the form of lube oil and unburned fuel, the so called soluble organic fraction (SOF), and the so called "sulfate" in the form of $SO_3+H_2O=H_2SO_4$.

Both NOx and particulates have been difficult diesel exhaust components to convert and future emissions standards have been recently adopted in the US and Europe for both heavy duty and light duty diesel powered vehicle which are expected to require reduction of both of these emissions by at least 50% and quite likely by 70–90%.

One commercial aftertreatment technology which has proven very successful for reduction of NOx under lean exhaust conditions for stationary sources is Selective Catalytic Reduction (SCR). In this process NOx is reduced to $N_2$ with $NH_3$ over a catalyst (e.g. zeolite, V/Ti). This technology is capable of NOx reduction in excess of 90% and thus it is one of the best candidates for meeting the aggressive NOx reduction goals. SCR is currently under development for mobile source, vehicle applications using urea (e.g. aqueous solution) as the source of $NH_3$. SCR is very efficient for NOx reduction as long as the exhaust temperature is within the active temperature range of the catalyst (e.g. >300° C.). Unfortunately diesel exhaust temperatures are many times considerably lower than that required for good catalyst efficiency (i.e., below "light-off"). This is especially true for light duty (LD) diesel applications such as diesel autos which operate at light load for the most part, resulting in very low exhaust temperatures (150–250° C.). Even diesel trucks operate under conditions which result in exhaust temperatures below the optimum temperatures for SCR catalysts. Unfortunately, one of the best, most stable, SCR catalysts, which is of the zeolite type (e.g. The assignee, Engelhard Corporation's ZNX catalyst, a Fe-Beta Zeolite), also has the highest optimum operating temperature. As a result its effectiveness is greatly diminished at diesel exhaust temperatures of interest.

One key aftertreatment technology under development or very high level particulate reduction is the diesel particulate filter. There are many known filter structures that can be used to remove particulates from diesel exhaust, including honeycomb wall-flow filters, wound or packed fiber filters, open-cell foams, sintered metal filters, etc. However, ceramic wall-flow filters have received the most attention. These filters are capable of removing over 90% of the particulate material from diesel exhaust and thus can meet this emissions reduction goal. The filter is a physical structure for removing particles from exhaust and the accumulating particles will increase the back pressure from the filter on the engine. Thus the accumulating particles (soot+ hydrocarbons) have to be continuously or periodically burned out of the filter to maintain an acceptable backpressure level. Unfortunately, the carbon soot particles require temperatures in excess of 500–550° C. to be combusted under oxygen rich (lean) exhaust conditions. This is higher than typical diesel exhaust temperatures. A means must be provided to lower the soot burning temperature in order to provide for "passive" regeneration of the filter. One good way to accomplish this is to provide a suitably formulated catalyst which is applied to the filter. The presence of the catalyst has been found to provide soot combustion and thereby regeneration of the filter at temperatures accessible within the diesel engine's exhaust under realistic duty cycles. In his way a Catalyzed Soot Filter (CSF) or Catalyzed Diesel Particulate Filter (CDPF) can be an effective way to provide for >90% particulate reduction along with passive burn-out of the accumulating soot and thereby filter regeneration.

In stationary applications, a number of arrangements routinely use filters upstream of an SCR catalyst with an ammonia reductant injected between filter and SCR catalyst. Several arrangements are disclosed in *Nitrogen Oxides Control Technology Fact Book*, 1992, Noyes Data Corporation, pages 84–105. However, all the temperatures for SCR are high and the filters, discussed generally, are of the dust particulate type such as electrostatic precipitators.

Hug Engineering AG has developed a gas purification stationary system described in SAE paper 930363, "Off-Highway Exhaust Gas After-Treatment Combining Urea-SCR, Oxidation Catalysis and Traps". In this system, $NH_3$ is injected upstream of catalyst beds containing an SCR followed by an oxidation catalyst. In a later Hug brochure (1996) a soot filter bed (optional) is provided in a casing adjacent to and upstream of a SCR reactor adjacent to and upstream of an oxidation catalyst and the urea injected into the waste gases passing through, in sequence, the filter, SCR and oxidation catalyst. The soot filter is described as a fibrous bundle which filters fine soot particles from the exhaust stream that have a carcinogenic effect. The Hug system disclosed has been applied to a ferry and other large diesel engine applications operating for the most part at steady speeds and higher temperatures than the vehicular applications of the present invention. A Hug brochure for stationary gas purification systems describes Hug's "Staru" system in which the soot filter is split from the SCR and oxidation catalysts with $NH_3$ injected therebetween. The soot filter described as fibrous to continue the function of trapping fine soot particles but is catalytically coated to regenerate late or burn off the soot at 450° C. In general, the Hug systems have shown the ability to reduce NOx exhaust emissions from large diesel engines operating generally steady state at higher temperatures than light duty diesel engines by injecting $NH_3$ upstream of SCR-oxidation catalysts and using a downstream fibrous, regeneration filter to trap fine soot particles.

The patent literature discloses U.S. Pat. No. 5,746,989 to Murachi et al. issued May 5, 1998 and PCT application PCT/GB99/03281 (published Apr. 20, 2000 as WO 00/21647) which use NOx absorbers that are periodically regenerated. Downstream of the NOx absorber is an oxidation catalyst and between absorber and oxidation catalyst is a particulate filter. In the '989 patent, the absorber is regenerated by varying the A/F ratio and in the PCT application, NOx reactant is injected upstream of the absorber.

U.S. Pat. No. 4,912,776 to Alcorn issued Mar. 27, 1990 discloses an oxidation catalyst, an SCR catalyst downstream and adjacent to the oxidation catalyst, and a reductant source introduced to the exhaust between the oxidation catalyst and the SCR catalyst. Consistent with at least one of the theories of the present invention, the Alcorn concept is believed to produce improved NOx reduction. A variation of Alcorn is disclosed in PCT application NO. PCT/GB99/00292 (published Aug. 12, 1999 as WO 99/39809)in which upstream of Alcorn's oxidation catalyst is placed a particulate filter and the source of reductant is positioned downstream of the SCR catalyst and upstream of the particulate filter. The particulate filter is disclosed as a wall-flow filter effective to cause "combustion" at relatively low temperatures in the presence of $NO_2$ which is not believed especially beneficial in the arrangement disclosed in the PCT application. U.S. Pat. No. 4,902,487 to Cooper et al. issued Feb. 20, 1990 should also be noted for its disclosure of a particulate filter upstream of a platinum based catalyst which arrangement is said to generate $NO_2$ from the exhaust gas.

SUMMARY OF THE INVENTION

Accordingly, it is one of the major undertakings of this invention to provide an aftertreatment system configured with a Catalyzed Soot Filter ($Pt/ZrO_2$—$CeO_2$) up-stream of a zeolite (e.g. ZNX) SCR Catalyst to produce substantially better NOx conversion performance than the zeolite SCR Catalyst alone, especially for higher NSR (normalized stoichiometric ratio) levels of reductant and at lower exhaust temperatures.

Particularly, the CSF and ZNX configuration makes the SCR more viable for LD diesel (lean burn) applications where duty cycles are characterized by low exhaust temperatures. The CSF and ZNX SCR configuration also exhibits better utilization of the $NH_3$ (preferred embodiment) reductant derived from injected urea solution than the ZNX SCR catalyst alone configuration and exhibits zero or very low $NH_3$ slip under all conditions. The CSF and ZNX SCR catalyst configuration is a viable aftertreatment system for simultaneous high level (e.g. >80%) reduction of both TPM and NOx for diesel engines.

One aspect of this invention is to combine particulate filtration with SCR to achieve the required high levels (>90%) of NOx and particulate removal from diesel exhaust simultaneously and thereby meet the objectives and overcome the emissions related problems. Specifically, the configuration of the invention combines a catalyzed soot filter in the exhaust up-stream of the SCR catalyst. Although any type of CSF can be used for this invention, the preferred type is one having a relatively high platinum (Pt) loading. This gives good soot burning (i.e., filter regeneration) characteristics along with other unanticipated advantages (see synergy, below). Although either V/Ti of Zeolite SCR catalysts can be used, a Zeolite catalyst such as ZNX is preferred because of its excellent hydrothermal stability.

An important factor of this invention is the discovery that there is an important synergy between the CSF and the SCR catalyst in that the presence of the CSF up-stream of the SCR catalyst significantly enhanced the NOx reduction performance of the SCR catalyst. In this configuration the ZNX SCR catalyst exhibited higher NOx conversion than the SCR catalyst alone at all temperatures, plus it extended the effective NOx conversion range of the ZNX SCR catalyst down to temperatures at least as low as 200° C. which is well below the effective temperature range of the ZNX catalyst alone.

It is thus an object of the invention to provide a system for improved conversion of NOx emissions from a diesel engine, or in another sense, for improved NOx emission conversion for any type of internal combustion engine of a lean burn type which produces relatively high NOx emissions.

It is another object of the invention to provide an improved exhaust treatment system which removes particulates and reduces NOx from diesel engine exhaust gases.

Yet another object of the invention is to provide an improved exhaust treatment system for diesel engines which extends the lower temperature range at which an SCR catalyst used in the system is effective to reduce NOx emissions.

Still another specific object of the invention is to provide an improved exhaust treatment system for diesel engines which has an ability to better utilize an external reductant or reducing agent in the reduction of NOx minimizing the tendency of the system to produce reductant slip.

Still another object of the invention is to provide a simple two part (filter & SCR) emission system sufficient to oxidize CO and HC, reduce the particulate emissions and reduce NOx emissions to $N_2$. That is an oxidation catalyst (downstream of the SCR catalyst) is strictly speaking, not necessary to meet emission regulations. An oxidation catalyst may, however, be provided to insure against ammonia slip which is potentially possible under transient emission conditions. Such oxidation catalyst, if used, would be of smaller capacity than those conventionally used to oxidize ammonia slip occurring in conventional ammonia reductant systems.

These and other objects, features and advantages of the invention will become apparent to those skilled in the art upon reading and understanding the Detailed Description of the Invention set forth below taken in conjunction with the drawings described below.

BRIEF DESCRIPTION OF THE DRAWINGS

The invention may take form in certain parts and in an arrangement of certain parts taken together and in conjunction with the attached drawings which form a part hereof and wherein.

DETAILED DESCRIPTION OF THE INVENTION

Figure 1:
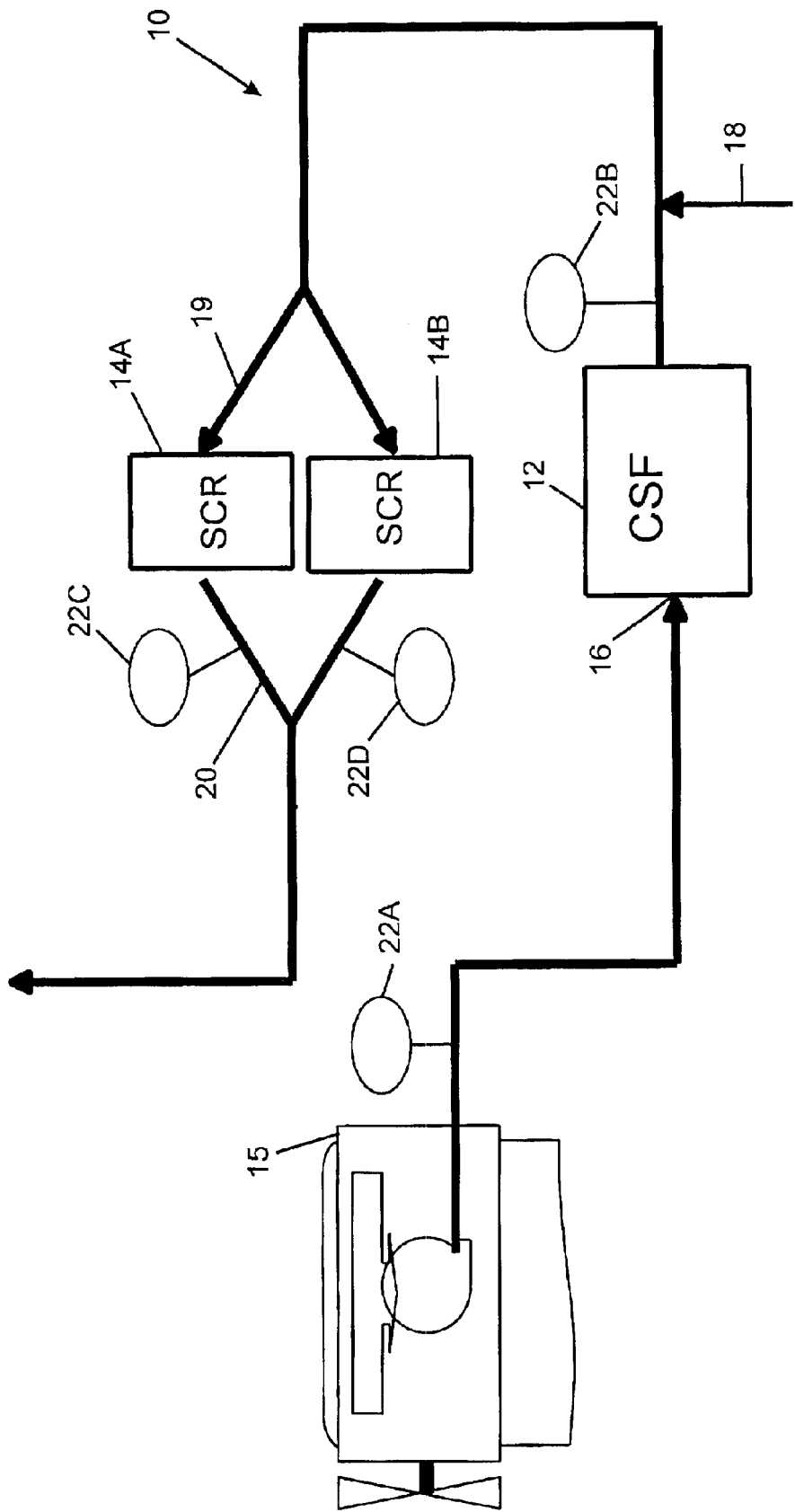
FIG. 1 is a schematic arrangement depicting a 7.2 liter Heavy Duty 300 HP diesel engine exhaust system and particularly an engine bench set-up for testing the catalyzed soot filter and urea SCR catalyst of the present invention.
Figure 14A:
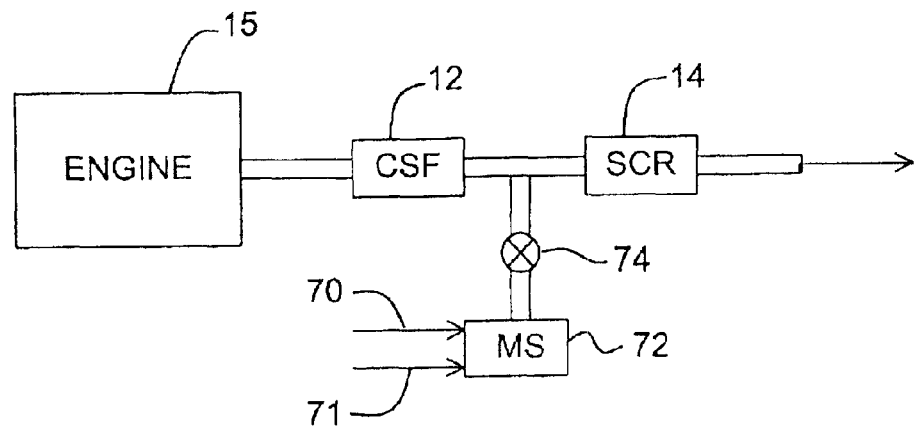
FIG. 14A is a schematic depiction of the preferred embodiment of the present invention.

Referring now to the drawings where the showings are for the purpose of illustrating a preferred embodiment of the invention only and not for the purpose of limiting same, there is shown in FIG. 1 a bench test unit 10 which does not represent the commercial embodiment of the invention in its preferred embodiment. (The preferred embodiment is schematically illustrated in FIG. 14A.) The test unit 10 is shown in FIG. 1 because the unanticipated synergy between an up-stream CSF 12 and an SCR catalyst 14 was discovered via engine tests in an engine-dynamometer test cell depicted schematically in FIG. 1.

The engine 15 was a Model Year 1998 Caterpillar 3126 (7.2 liter) Direct Injected, Turbo-Charged/Intercooled engine rated at 300 HP @ 2200 RPM. For the purposes of the tests the engine was calibrated to produce 4 g/bhp-hr NOx emissions over the U.S. Heavy Duty Transient Test Cycle.

For the tests the fuel was an ultra-low sulfur (ULS) diesel fuel provided by Phillips Petroleum. This fuel had a nominal sulfur content of 3 ppm.

The soot filter substrate used for the tests was an EX-80 cordierite wall-flow filter purchased from Corning Inc. The substrate was 10.5" in diameter and 12.0" long. This filter had a total volume of 17.03 liters (1039 in$^3$) or 2.4 times the swept displacement of the engine. It had a honeycomb cell spacing of 100 cpsi with a 17 mil wall thickness. The soot filter catalyst used for the tests was the assignee, Engelhard Corporation's, filter catalyst designated MEX 003. This catalyst is comprised of 250 g/ft$_3$ $ZrO_2$ applied to the soot filter substrate by solution impregnation as zirconium acetate solution and then dried, plus 500 g/ft$_3$ $CeO_2$ applied next by solution impregnation as cerium (III) nitrate/citric acid solution (Ce:citrate mole ratio=1:1) and then dried and calcined at 450° C., plus 75 g/ft$^3$ platinum applied by solution impregnation as amine-solubilized Pt(II) hydroxide (i.e. Pt "A" Salt) which was then dried and calcined at 450° C. This comprised the catalyzed soot filter in the preferred embodiment or CSF 12.

SCR catalysts 14A, 14B used for the tests were the assignee's, (Engelhard Corporation), ZNX catalyst. Two SCR units 14A, 14B arranged in a "Y" split are shown because FIG. 1 is a bench unit capable of testing different catalysts so that a reference catalyst performance can be compared to a modified catalyst. With respect to the subject invention, both SCR catalysts 14A, 14B are identical. The SCR catalysts 14A, 14B, each were comprised of ca. (calculated) 2 g/in$^3$ Iron-exchanged Beta zeolite together with 4 wt % $ZrO_2$ binder. This catalyst was coated onto flow-thru monolith substrates which were 10.5" in diameter and 6.0" long with a cell spacing of 300 cpsi. Each substrate had a volume of 8.51 liters (520 $in^3$) for a total catalyst volume of 17.02 liters or 1040 $in^3$.

As can be seen from FIG. 1, the exhaust from engine 15 containing particulates and NOx is conveyed to an inlet 16 of CSF 12. On passing through CSF 12 the particulates including soot and SOF (soluble organic fractions) are largely removed (>90%). In addition gas phase HC's and carbon monoxide are removed from the exhaust by the catalyst on the soot filter. The resultant cleaned exhaust contains primarily NOx as the main regulated emission.

Down-stream of the CSF a solution of urea in water is injected into the exhaust, in this case via an air assisted nozzle designated generally by reference numeral 18. The concentration of urea in the solution was 32.5 wt % and it was delivered to the injection nozzle via a pump. The injection rate of urea solution was regulated via the pump rate so that the ratio of urea injected to NOx in the exhaust could be controlled and known. As is well known, the urea ($H_4N_2CO$) molecule can be decomposed by hydrolysis in the exhaust to give ammonia ($NH_3$) which is the active NOx reductant. Each urea molecule yields two molecules of $NH_3$. Because of this 2:1 yield and for the purposes of describing the testing and results the urea-to-NOx ratio will be referred to as the Normalized Stoichiometric Ratio (NSR). This simply means that for an NSR of 1 the $NH_3$:NOx molar ratio in the exhaust is 1:1. A 1:1 molar ratio of $NH_3$ to NOx is the theoretical ratio to achieve 100% NOx conversion to $N_2$.

The exhaust stream containing the injected urea and/or ammonia products at the desired NSR was next conveyed to the ZNX SCR catalysts 14A, 14B. As noted above, for the tests, the exhaust flow was split using a Y-connector 19 and conveyed to two ZNX catalysts or bricks 14A, 14B which are mounted in parallel as shown. This arrangement gave a total volume of SCR catalyst 14 of 17.03 liters or 2.4 times the swept displacement of the engine. Down-stream of the ZNX SCR catalysts 14A, 14B the exhaust streams were brought back together via a Y-connector 20 and the exhaust gas, now cleaned of both particulates and NOx was conveyed out of the test cell.

Sampling points for exhaust analysis are shown in FIG. 1 by lines designated by reference numerals 22A, 22B, 22C and 22D. The normal exhaust emission bench was used for analyzing NOx, HC's and CO. The NOx was determined by the chemiluminescence technique. In addition, Fourier Transform Infrared Spectroscopy (FTIR) was used to analyze for nitrogen-species at the sampling points. The FTIR allowed for accurate determination of NO, $NO_2$, $N_2O$ and $NH_3$ in the exhaust. Exhaust temperatures were also measured via thermocouples at sampling points 22A, 22B, 22C and 22D.

Control tests were run for comparison with the ZNX SCR catalysts 14A, 14B alone. In this case, CSF 12 was removed from the exhaust system and replaced by a straight pipe (not shown). A valve (not shown) down-stream of the SCR catalysts was used to provide the same back-pressure on the engine as when the CSF was present in order to maintain the same engine-out NOx levels. The valve provides an adjustable back pressure for the step load tests discussed below.

Steady state tests were run at 1800 RPM on the engine. Engine load was varied to achieve different exhaust temperatures. The steady state test conditions and correspondence to drawings to be subsequently discussed are summarized below in Table 1:

TABLE 1

Steady State Speed of 1800 rpm

| Load | SCR Cat Inlet T | Exhaust Flow (SCFM) | SCR Cat GHSV (1000 Hr-1) | NOx (ppm) | FIGS. |
|---|---|---|---|---|---|
| 14% | 200° C. | 285 | 28.3 | 214 | 6, 7 |
| 60% | 345° C. | 471 | 46.9 | 420 | 4, 5 |
| 100% | 468° C. | 515 | 51.3 | 770 | 2, 3 |

At each of these steady state conditions urea solution was injected into the exhaust at different rates to vary the NSR level. Emissions were measured for each NSR level and the NOx conversion and $NH_3$ slip (break through) determined. This was done for the CSF and ZNX SCR catalyst configuration and the ZNX SCR Catalyst alone configuration. The results are discussed below. The results based on the FTIR measurements are shown, but these were in good agreement with the chemiluminescence results.

Figure 2:
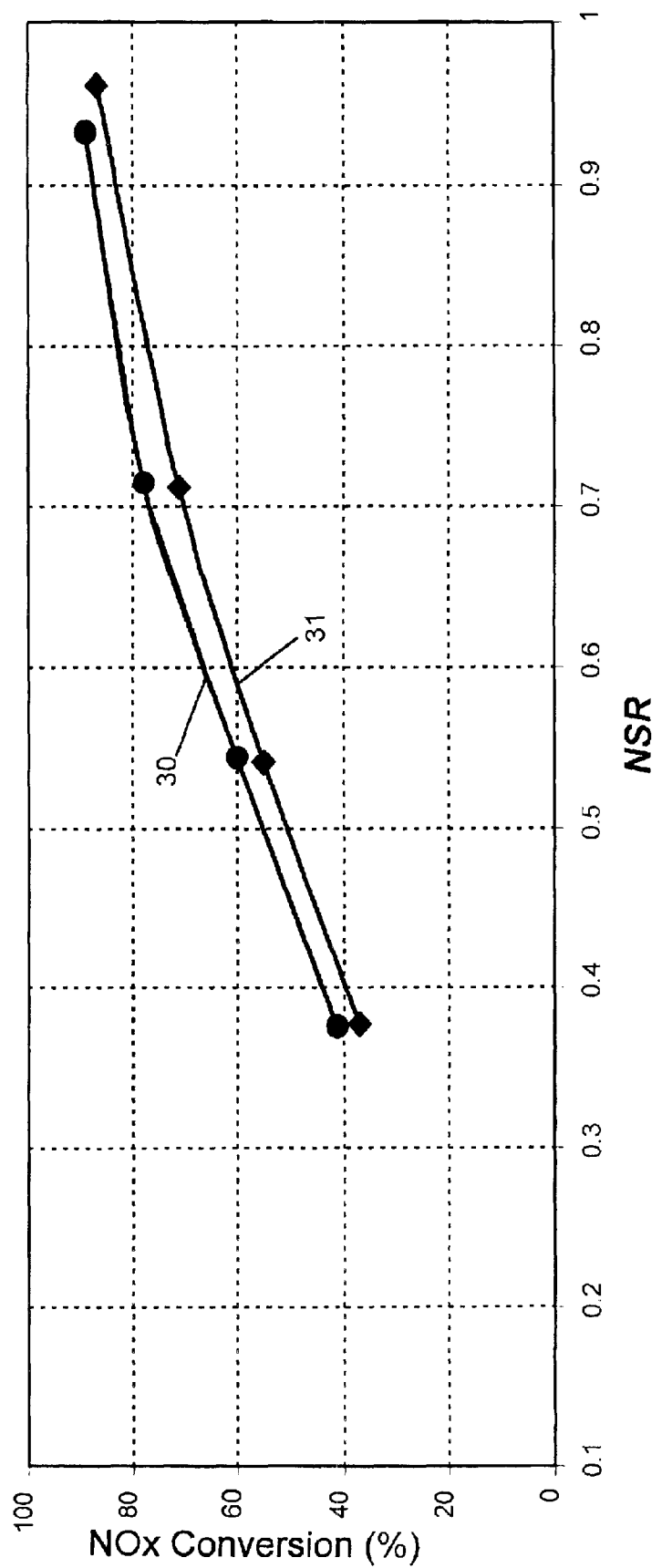
FIG. 2 is a plot of graphs of engine test results comparing NOx conversion performance of an exhaust system using an SCR catalyst alone and an exhaust system using CSF and SCR catalysts as a function of NSR at 470° C. inlet temperature for the engine of FIG. 1 operated under 100% load at 1,800 rpm producing engine out NOx of 780 ppm at space velocity of 51.33 k hr.−1.

FIG. 2 shows the NOx conversion levels as a function of NSR for the CSF and ZNX SCR configuration indicated by the trace passing through circles designated by reference numeral 30 and for the ZNX SCR catalyst configuration alone indicated by the trace passing through diamonds designated by reference numeral 31 at the 100% load/468° C. SCR inlet condition. As can be seen there appears to be a slight advantage for the CSF and ZNX catalysts configuration, but the NOx conversion performance of both systems is very similar. The NOx conversion levels are essentially at or slightly above theoretical for the calculated NSR level thus showing very high level utilization of the urea reductant and thereby very high NOx conversion. Note from Table 1 that the exhaust inlet temperature of 468° C. is well within the ZNX SCR catalyst temperature window for optimum catalyst activity. The addition of CSF catalyst 12 does not materially change the $NO_2$ conversion efficiency which would be expected. That is, one would expect the SCR catalyst to perform within its operating temperature window and improved results by addition of an upstream catalyst should not occur.

Figure 3:
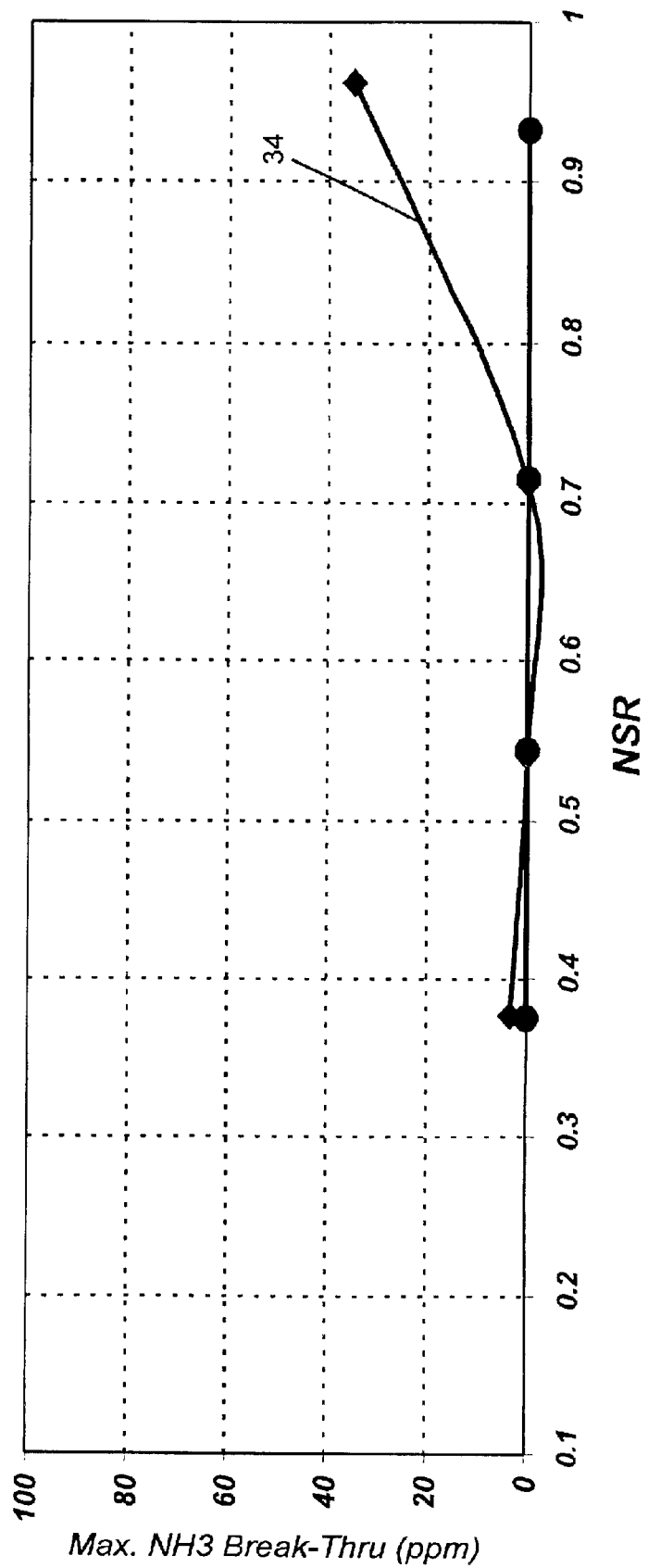
FIG. 3 is a plot of graphs of engine test results comparing maximum $NH_3$ break through for an exhaust system having CSF and SCR catalysts and an exhaust system having only an SCR catalyst as a function of NSR under the same engine conditions set forth for FIG. 2.

FIG. 3 shows the maximum $NH_3$ break through levels as a function of NSR for the same runs at 100% load/468° C. SCR inlet condition. As can be seen $NH_3$ break through for the ZNX SCR catalyst alone configuration is very low to at least an NSR level of ca. 0.7. However, at an NSR of ca. 0.96 the ZNX alone configuration indicated by the trace passing through diamonds designated by reference numeral 34 exhibits a maximum $NH_3$ break through of nearly 40 ppm. The goal should be to keep $NH_3$ slip at all times below ca 20 ppm and preferably below 10 ppm. The CSF and ZNX configuration, on the other hand, indicated by the trace passing through diamonds designated by reference numeral 35 exhibited no (0 ppm) $NH_3$ break through at all NSR levels. This is somewhat surprising because both systems (SCR along and CSF and SCR showed similar NOx conversion ranges) and shows a clear advantage to the continuation of CSF catalyst 12 upstream of SCR catalyst 14 for preventing ammonia slip.

Figure 4:
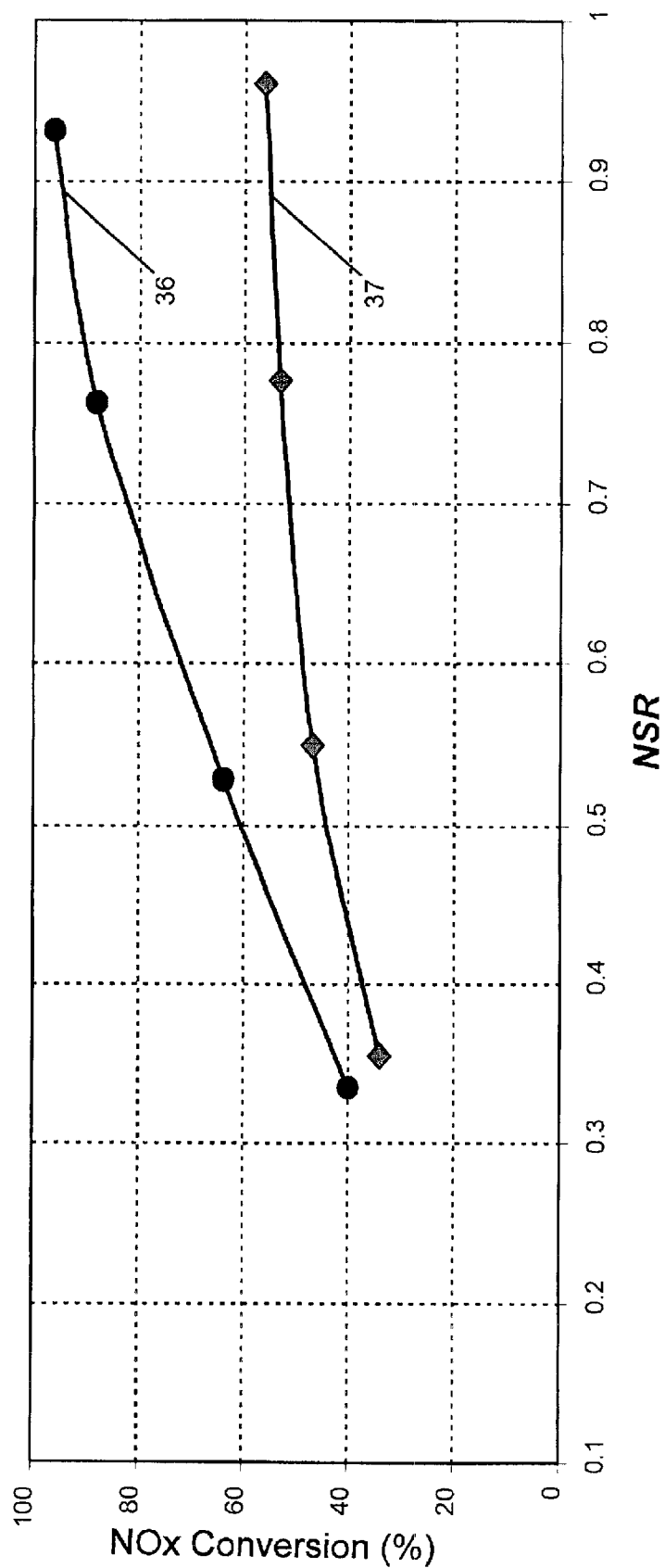
FIG. 4 is a plot of graphs similar to FIG. 2 showing engine test results comparing NOx conversion performance of exhaust systems having only an SCR catalyst and CSF and SCR catalysts as function of NSR at 345° C. SCR inlet temperature for the engine of FIG. 1 operated under 60% load at 1,800 rpm producing engine out NOx of 400 ppm at space velocity of 46.94 k hr.−1.

FIG. 4 shows NOx conversion as a function of NSR for the CSF 12 and SCR 14 catalyst arrangement which is shown as the trace passing through circles designated by reference numeral 36. When the emission system was only SCR 14 by itself, the NOx conversion is shown as the trace passing through diamonds designated by reference numeral 37. Traces 36, 37 were developed with engine 15 at the 60% load/345° C. SCR inlet condition. As can be seen, at low NSR ratios, CSF and ZNX SCR trace 36 exhibits only a slight advantage in NOx conversion over ZNX alone trace 37. However, as the NSR ratio is increased to obtain higher NOx conversion, the performance advantage of the CSF and ZNX SCR configuration also increases. At the highest NSR levels evaluated (>0.9) the NOx conversion of the ZNX SCR alone configuration appears to be leveling off at ca. 60%. It should be noted that the temperature for the steady state condition plotted in FIG. 4, lies at the lower edge of the temperature window for optimum conversion activity for the ZNX catalyst alone. The NOx conversion for the CSF and ZNX SCR catalyst configuration, as shown in FIG. 4, is nearly 100%. This shows a clear improvement in the SCR reaction by the presence of CSF catalyst 12 up-stream of the ZNX SCR catalyst 14. It also shows excellent utilization of the $NH_3$ derived from urea for the CSF and ZNX configuration.

Figure 5:
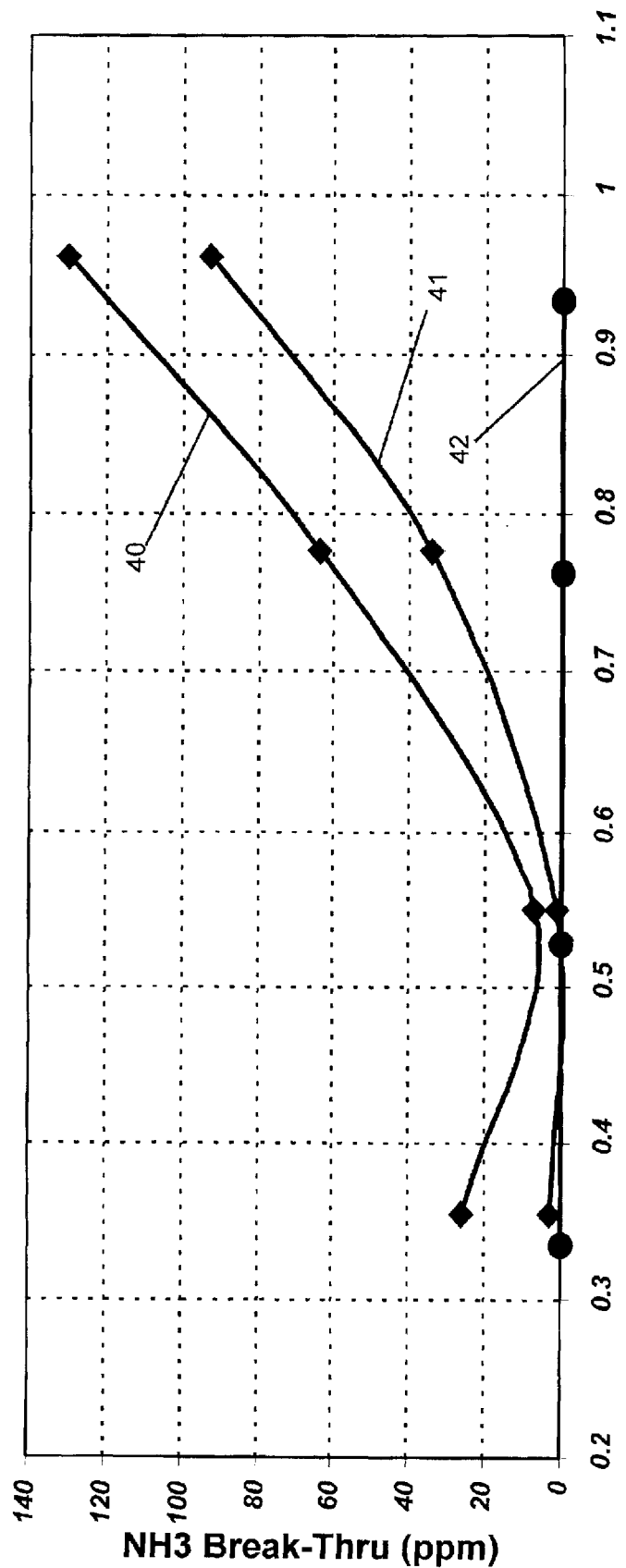
FIG. 5 is a plot of graphs showing engine test results comparing average and maximum $NH_3$ break through for an exhaust system having the SCR catalyst alone and an exhaust system having the CSF and SCR catalysts as a function of NSR at conditions specified in FIG. 4.

In FIG. 5 which was generated with the engine at 60% load/345° C. SCR inlet temperature condition, the maximum $NH_3$ break through is indicated by a trace passing through diamonds designated by reference numeral 40 and the average. $NH_3$ break through is indicated by a trace also passing through diamonds but designated by reeference numeral 41 $NH_3$ break through for the ZNX SCR catalyst alone configuration. Also plotted is the maximum $NH_3$ break through for the ZNX SCR catalyst configuration as shown by the trace passing through circles designated by reference numeral 42. At this temperature and condition the ZNX SCR catalyst alone configuration exhibits much increased $NH_3$ break through, especially at NSR levels greater than ca. 0.55. This is consistent with what would be expected from studying FIG. 4 which shows a leveling off of the $NO_x$ conversion performance at higher NSR ratios as a result of poorer utilization of $NH_3$ from urea. In marked contrast, the maximum $NH_3$ break through for the CSF and SCR configuration was zero at each of the NSR levels tested as shown by trace 41. This is also consistent with FIG. 4 which shows for higher NSR ratios a high $NO_x$ conversion and thus full utilization of $NH_3$ from urea.

Figure 6:
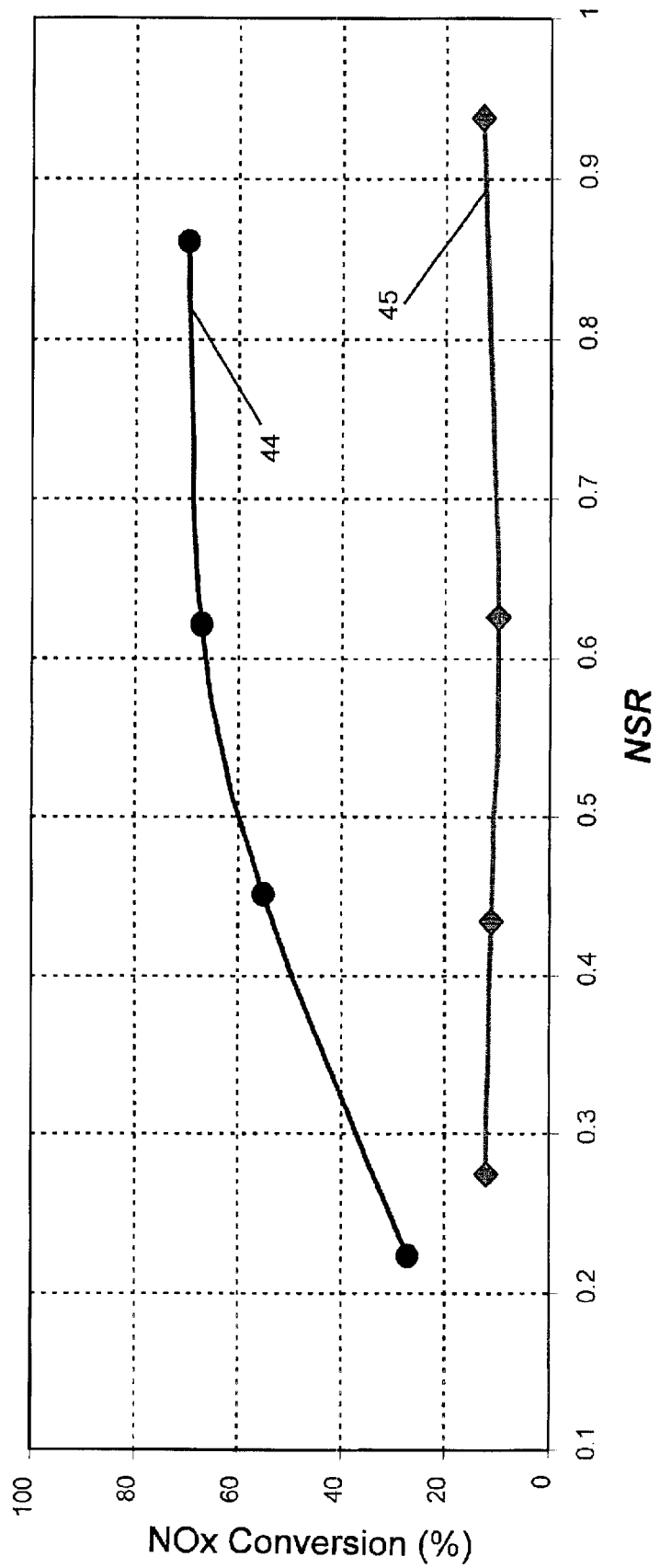
FIG. 6 is a plot of graphs similar to FIGS. 2 and 4 showing NOx conversion performance of an exhaust system having only an SCR catalyst and an exhaust system having the CSF and SCR catalysts as a function of NSR at 200° C. SCR inlet temperature for the engine of FIG. 1 operated under 14% load at 1,800 ppm producing engine out NOx of 200 ppm at space velocity of 28.33 k hr.−1.

FIG. 6 shows, with engine 15 at the 14% load/200° C. SCR inlet condition, the NOx conversion as a function of NSR for the CSF and SCR catalysts as a trace passing through circles designated by reference numeral 44 and the SCR catalyst alone configuration as a trace passing through diamonds designated by reference numeral 45. At this condition the Nox conversion with the ZNX SCR catalyst alone configuration is rather low (10–15%) and is essentially unresponsive to changes in NSR level. The exhaust temperature (200° C.) is well below the temperature window normally observed for the ZNX SCR catalyst activity. However, with CSF 12 up-stream of the ZNX SCR catalysts 14 good NOx conversion was observed. The NOx conversion increased with increasing level of NSR until it leveled off at ca. 70% for NSR above ca. 0.63. Specifically, FIG. 6 shows that SCR catalyst 14 is catalytically active at light engine loads producing low temperatures of 200EC in that at least 50% of NOx emissions are reduced to N2 by SCR catalyst. As clearly shown by trace 45, ZNX SCR catalyst 14 is not normally catalytically active at this temperature at the space velocities measured. It is now possible to use the CSF and SCR catalyst configuration for low load diesel driving conditions, such as are encountered for LD diesel autos or SUV's.

Figure 7:
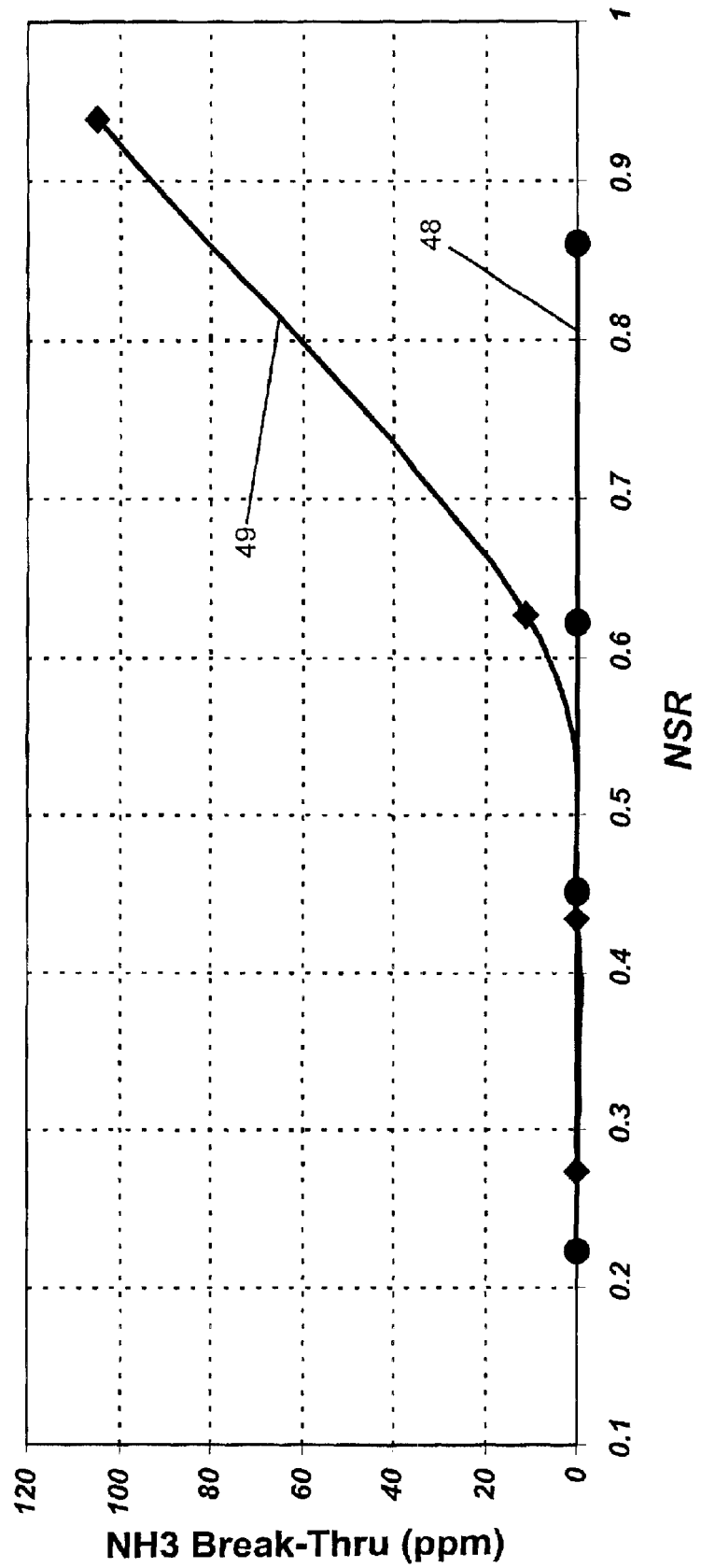
FIG. 7 is a plot of graphs similar to that shown in FIGS. 3 and 5 of maximum $NH_3$ breath through for an exhaust system having the CSF and SCR catalysts and the SCR catalyst alone as a function of NSR at engine conditions specified in FIG. 6.

FIG. 7 shows, at the 14% load/200° C. SCR inlet condition, the maximum $NH_3$ break through as a function of NSR for the CSF and ZNX SCR catalyst configuration indicated by a trace passing through circles designated by reference numeral 48 and the ZNX SCR catalyst alone configuration indicated by a trace passing through diamonds designated by reference numeral 49. As can be seen, the ZNX SCR alone configuration, trace 49, exhibits $NH_3$ break through above an NSR level of ca. 0.62 and the $NH_3$ break through becomes very high at NSR levels above 0.9. The CSF and ZNX configuration of the present invention, trace 48, exhibited zero $NH_3$ break through for all levels of NSR which were evaluated.

Figure 8:
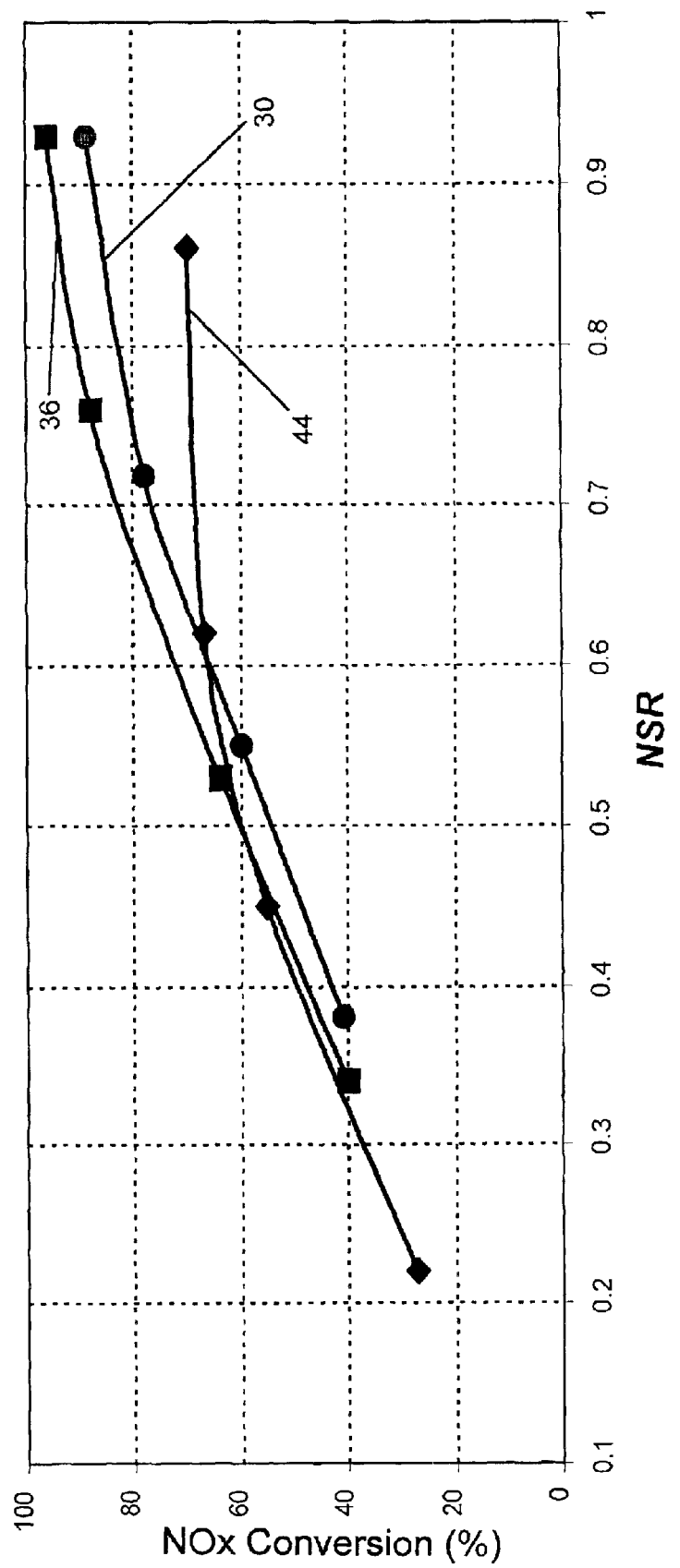
FIG. 8 is a plot of graphs of test results for exhaust systems configured with the CSF and SCR catalysts showing NOx conversion as function of NSR (normalized stoichiometric ratio) at different exhaust temperatures produced by the engine of FIG. 1 operated at 2200 rpm under different loads.

FIG. 8 is a summary graph and shows NOx conversion as a function of NSR for the CSF and ZNX SCR catalyst configuration of the present invention at all three of the steady state conditions (100%, 60% & 14% load) discussed above. These are the same results shown in FIGS. 2, 4 & 6, but plotted on the same chart and the traces carry the same reference numerals previously described. As can be seen the NOx conversion as a function of NSR is very similar at each of the test conditions—exhaust temperatures of 470, 345 & 200° C. Furthermore, the NOx conversion levels are at or above the theoretical for calculated NSR with the exception of ca. 0.86 NSR at the 200° C. SCR catalyst inlet temperature shown as trace 44.

Figure 9:
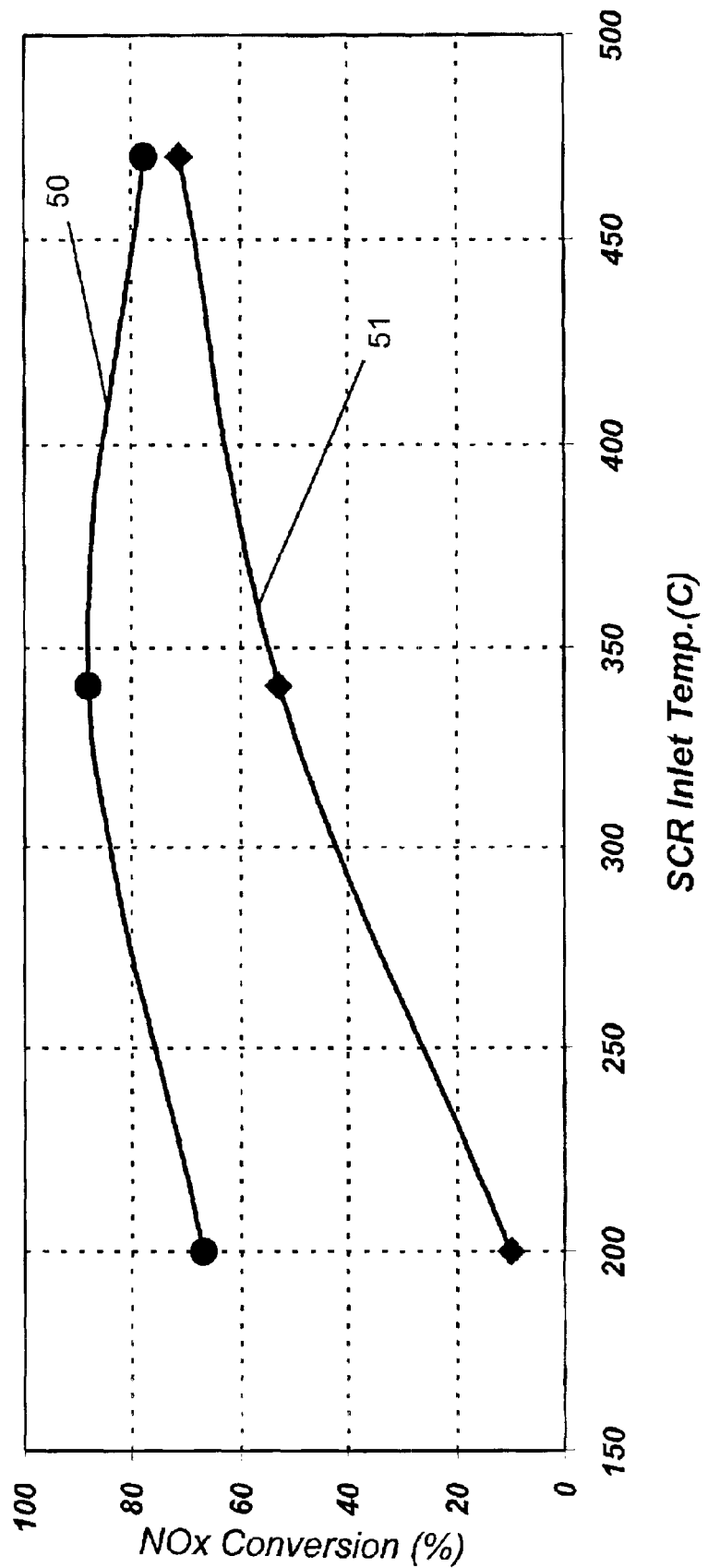
FIG. 9 is a plot of graphs of engine test results comparing NOx conversion performance of emission system using the CSF and SCR catalysts and an emission system using an SCR catalyst alone as a function of inlet temperature for a high range of NSR values (0.61 to 0.78)

FIG. 9 shows a view of the results from a different perspective. This figure plots NOx conversion as a function of SCR catalyst inlet temperature for some of the higher NSR ratios between 0.61–0.78. For these higher ratios, the performance of the inventive configuration of downstream CSF 12 and upstream SCR 14 is shown by a trace passing through circles designated as reference numeral 50 while the performance of an emission system equipped only with a SCR catalyst 14 is shown by a trace passing through diamonds designated by reference numeral 51. The traces 50, 51 show the clear performance advantage of the CSF and SCR configuration over the SCR alone configuration at lower exhaust inlet temperatures. Similar but not as dramatic curves can be plotted at lower values of NSR. Because lower NSR ratios are not likely to be used in commercialization of the invention, they are not shown. That is the invention (which typically does not use an NSR ratio higher than 1) utilizes NSR ratios in the ranges depicted, i.e., between 0.61 to 1.0 so that the reductant is efficiently utilized and sizing of SCR is minimized. However, some improvement will occur at lower ranges and improvement at higher NSR ratios approaching 1.5 is expected.

Engine tests were also run using the more dynamic Euro III test cycle which is also referred to as the OICA Cycle or European Stationary Cycle (ESC). This test cycle is comprised of 25, 50, 75 & 100% loads for three different speeds (12 test conditions total) under the engine's torque curve, plus idle (1 test condition). Examples of the key results obtained from the ESC tests are discussed, below.

Figure 10:
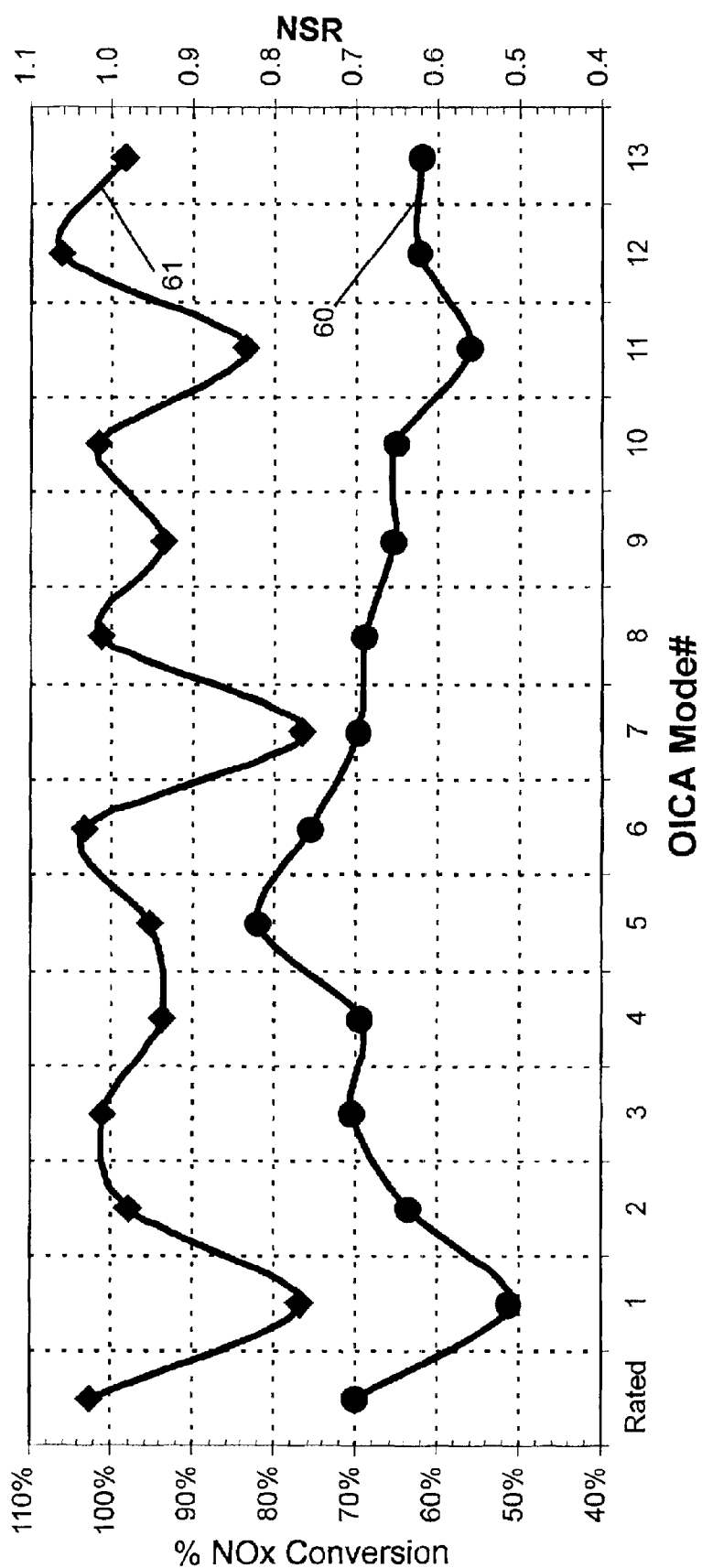
FIG. 10 is a plot of curves of ESC (13 mode OICA cycle) test results (NOx and NSR) for an emission system using an SCR catalyst only scaled to the normal 300 HP engine rating.

FIG. 10 shows the OICA Cycle Results for the ZNX SCR catalyst 14 alone configuration with the conditions scaled to the normal 300HP engine rating. For this test the average SCR inlet exhaust temperature was 357° C. The chart shows the mode-by-mode NOx conversion and RSR level used. More particularly, the NOx conversion, read from the left y-axis, is shown by a trace passing through circles designated by reference numeral 60 and the NSR, read from the right y-axis, is shown by a trace passing through diamonds designated by reference numeral 61. For an average NSR level of ca. 0.985 the weighted NOx conversion over the test cycle was 67.3%. The maximum NH₃ slip observed over the cycle was 241 ppm.

Figure 11:
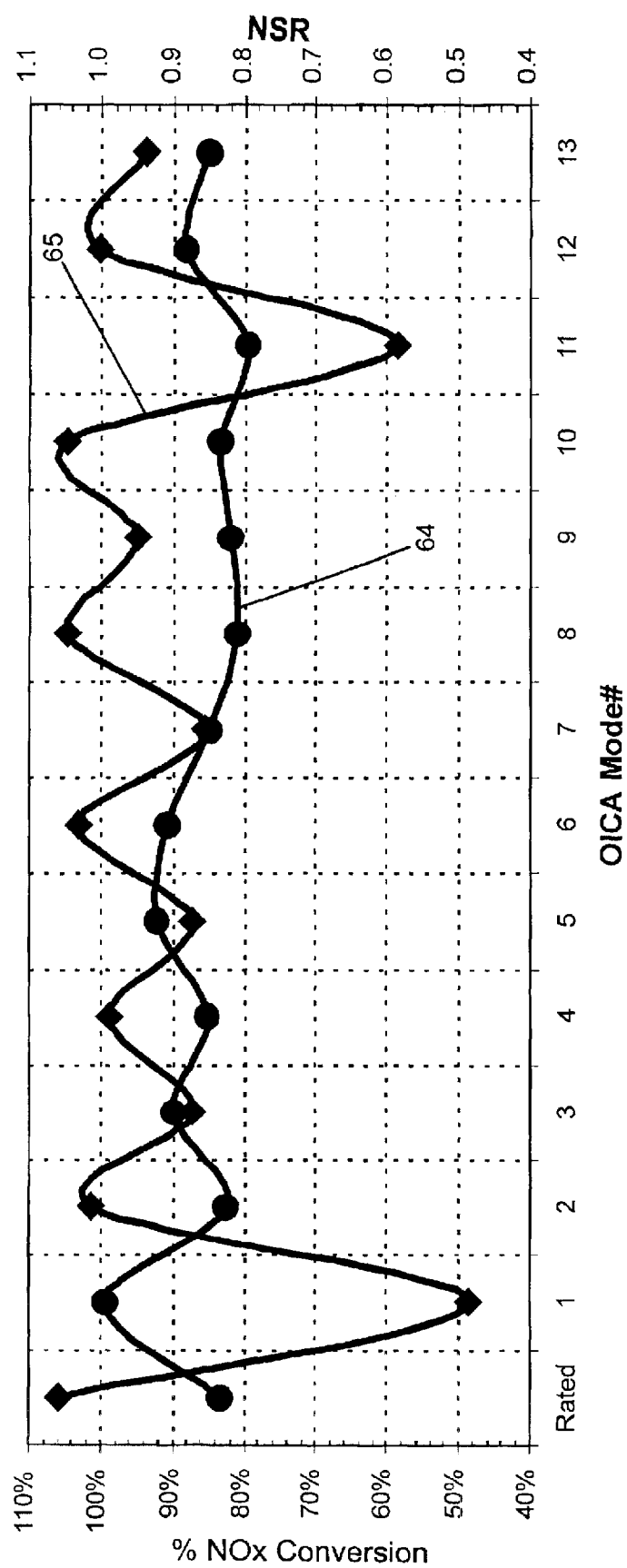
FIG. 11 is a plot of curves similar to FIG. 10 and for the ESC test but using an emission system having a CSF and SCR catalyst configuration scaled to the normal 300 HP engine rating.

FIG. 11 shows for comparison the results for the same OICA Cycle as in FIG. 10, but for CSF 12 and ZNX SCR catalyst 14 configuration. In FIG. 11, the NOx conversion, read from the left y-axis, is shown by a trace passing through circles designated by reference numeral 64 and the NSR value, read from the right hand y-axis, is shown by a trace passing through diamonds designated by reference numeral 65. As can be seen for a comparable average SCR inlet temperature of 367° C. and an average NSR of 0.976 the average weighted cycle NOx conversion observed was 85.1% —nearly 20% higher than for the ZNX SCR alone configuration. There was no NH₃ break through observed over this test cycle.

The OICA Cycle tests were repeated, but with scaling of the load points to a 180 HP engine rating. In effect this reduced the average exhaust temperatures and lowered total exhaust flows.

Figure 12:
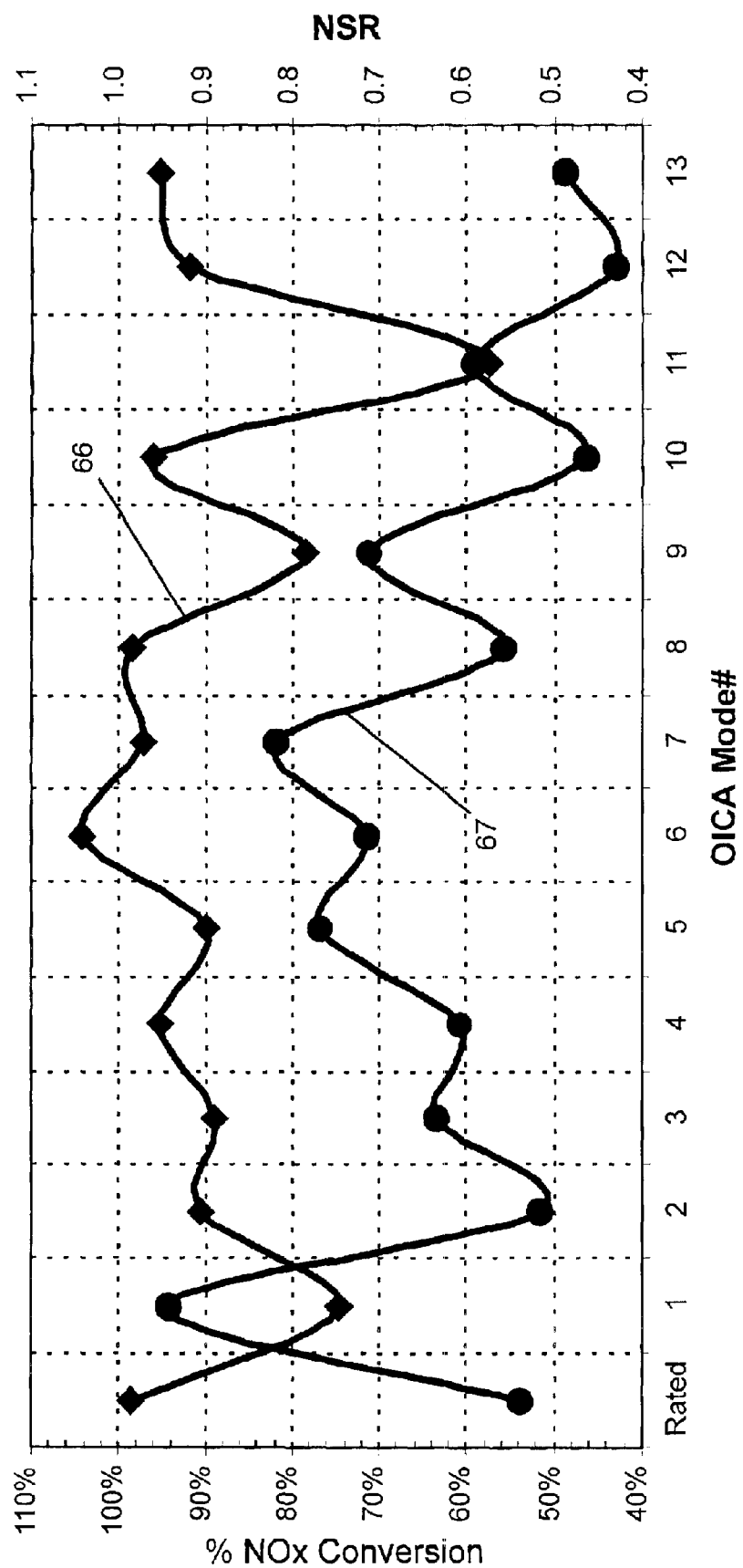
FIG. 12 is a plot of curves similar to FIG. 10 and for the ESC test for an emission system using only an SCR catalyst scaled to a normal 180 HP engine rating.

FIG. 12 shows the OICA Cycle results for the ZNX SCR catalyst 14 alone configuration. The NSR trace passes through diamonds designated by reference numeral 66 and the NOx trace passes through circles designated by reference numeral 67. As can be seen for an average SCR catalyst inlet temperature of 288° C. and an average NSR level of 0.921 a weighted average NOx conversion over the test cycle of 58.2% was obtained. This was ca. 9% lower than for the same configuration for the 300 HP test with average temperature of 357° C. The maximum NH₃ slip observed over the test cycle was 310 ppm.

Figure 13:
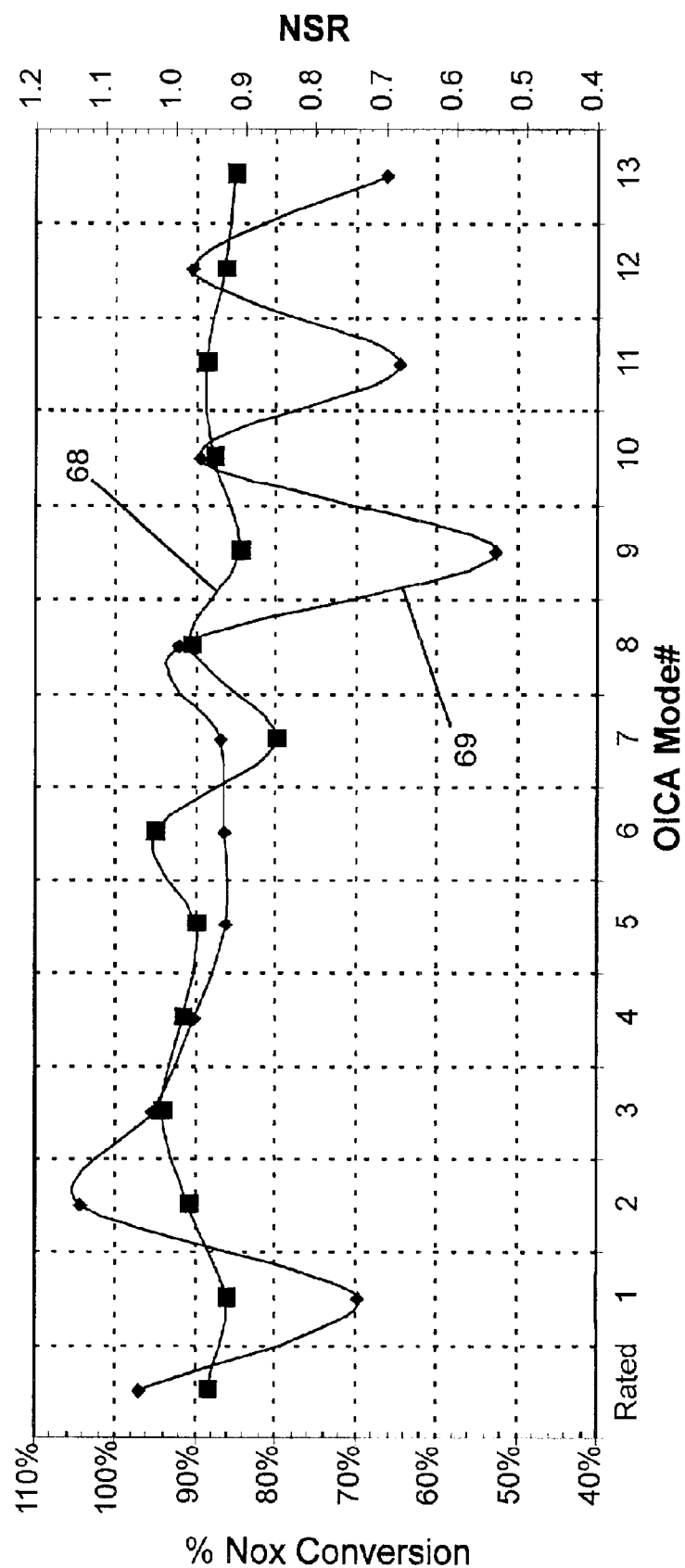
FIG. 13 is a plot of curves similar to FIG. 10 and for the ESC test for an emission system using a CSF and SCR catalyst configuration scaled to a normal 180 HP engine rating.

FIG. 13 shows the OICA Cycle results for the CSF 12 and SCR 14 catalysts configuration at the 180 HP rating. The NSR trace passes through diamonds designated by reference numeral 68 and the NSR trace passes through squares designated by reference numeral 69. As can be seen for an average SCR catalyst inlet temperature of 296° C. and with an average NSR of 0.963 a weighted average NOx conversion of 89.9% over the cycle was obtained. This was slightly better than for this configuration at the 300HP rating at an average 367° C. which temperature, in turn, is better matched to the ZNX SCR catalyst activity window. However, its possible that the lower exhaust flows and thereby lower GHSV's (space velocity through the SCR) for the 180 HP condition compensated for the lower temperature condition. For the 180 HP condition the CSF and ZNX SCR configuration gave over 30% higher weighted average cycle NOx conversion than did the ZNX SCR alone configuration. The CSF and ZNX configuration exhibited no NH₃ break through over the test cycle.

The OICA Cycle results also showed that final HC emissions were reduced significantly by either configuration. However, with the CSF up-stream the HC's were removed prior to the SCR catalyst but with the ZNX SCR catalyst alone configuration both HC's and NOx had to be converted over the SCR catalyst. The ZNX SCR catalyst alone configuration exhibited little CO conversion as might be expected. With CSF catalyst 12 up-stream, a high level of CO conversion was obtained over CSF catalyst 12 presenting a low CO exhaust to SCR catalyst 14. This is probably not that significant for SCR catalyst activity, but overall, tailpipe CO is substantially decreased with the CSF present.

Table 2 set forth below summarizes the ESC test as follows:

TABLE 2

ESC Test Data

| Configuration | Temperatures, deg C. CSF In | Temperatures, deg C. SCR In | Temperatures, deg C. SCR Out | Avg. NSR | Avg. NOx Conv. % | Max NH₃ Slip ppm | SCR Out Emissions, g/kW-hr HC | SCR Out Emissions, g/kW-hr CO | SCR Out Emissions, g/kW-hr NOx |
|---|---|---|---|---|---|---|---|---|---|
| FIG. 10 SCR 300 HP | | 357 | 368 | 0.985 | 67.3% | 241 | 0.04 | 0.83 | 2.07 |
| FIG. 11 CSF + SCR 300 HP | 399 | 367 | 376 | 0.976 | 85.1% | 0 | 0.03 | 0.07 | 0.92 |
| FIG. 12 SCR 180 HP | | 288 | 300 | 0.921 | 58.2% | 310 | 0.07 | 1.09 | 2.51 |
| FIG. 13 CSF + SCR 180 HP | 321 | 296 | 303 | 0.963 | 89.9% | 0 | 0.04 | 0.1 | 0.61 |

The results of the OICA Cycle tests were consistent with the steady state tests showing improved performance of the CSF and SCR catalysts configuration compared with the SCR catalyst alone configuration for total NOx conversion and control of NH₃ break through.

1) In general summary, the Steady State Tests showed:
 a) A slight advantage of CSF and SCR over SCR alone as a function of NSR at high inlet temperature (470° C.). Both configurations attained ca.80–90% NOx conversion for NSR=0.8–0.9;
 b) For lower inlet temperatures (345° C. & 200° C.) the CSF and SCR configuration gave substantially better NOx conversion than the SCR alone configuration at all NSR levels, but especially at higher NSR's. CSF and SCR attained 70–90% NOx conversion for NSF=0.7–0.9. Activity for NOx conversion for SCR alone decreased with decreasing inlet temperature while CSF and SCR maintained activity;

c) The CSF and SCR system gave 70% NOx conversion at 200EC for NSR 0.7–0.85 and SCR alone configuration gave only 10%. CSF and SCR is therefor viable for light load and light duty diesel applications;

d) The more effective utilization of the reductant by this invention results in less unreacted ammonia leaving the catalyst. In these experiments virtually all of the available reductant (ammonia) was used to reduce NOx and therefore no unreacted ammonia could be detected at the catalyst exit; and, 2) The ESC Cycle Testing showed:

e) The 300 HP rated modes resulted in an average exhaust temperature of ca. 360° C. The SCR catalyst alone (two parallel bricks) gave 67% weighted cycle NOx reduction for NSR 0.98 with $NH_3$ slip. The CSF and SCR (two parallel bricks) system gave 85% weighted cycle NOx reduction for NSR's of 0.98 with no $NH_3$ slip; and, f) The 180 HP rated modes resulted in an average exhaust temperature of 290° C. Weighted cycle NOx reduction of 58% was attained with SCR alone at NSR=0.92 with $NH_3$ slip. The CSF and SCR (two bricks in parallel) system gave 90% weighted cycle NOx reduction for NSR=0.96 with no $NH_3$ slip.

In general summary, the tests discussed above showed a clear performance advantage for the CSF and SCR catalysts configuration compared with the SCR catalyst alone configuration, especially with respect to NOx conversion, $NH_3$ utilization and $NH_3$ break through at low exhaust temperatures and at higher NSR levels. While the inventors do not intend necessarily to be bound by any particular theory, there are several reactions which may contribute to the unexpected results disclosed above.

First CSF catalyst 12 is removing the particulates (carbon soot and liquid HC SOF's (soluble organic fractions)) from the exhaust before it can reach the SCR catalyst. It's possible that this particulate material could deposit on the SCR catalyst 14 and reduce its effectiveness via fouling or occupation of active catalyst sites. The removal of the particulates could thus be an advantage. In addition the CSF gives a high conversion of gas phase hydrocarbons before they encounter the SCR catalyst. These HC's could also occupy catalyst active sites thereby interfering with the SCR activity.

CSF 12 used for the tests was formulated with a relatively high Pt loading level (75 g/ft$^3$). FTIR exhaust emissions analysis showed that consistent with known operating characteristics of diesel engines, the engine-out NOx was primarily in the form of NO with a very small level of $NO_2$. Thus, the $NO_2$/NOx ratio was very low. This was the nature of the NOx entering CSF catalyst 12. The exhaust gas coming out of CSF catalyst 12, however, showed significantly higher levels of $NO_2$ and the $NO_2$/NOx ratio was also higher than engine-out. That is, the nature or composition of the NOx entering ZNX SCR catalyst 14, i.e., at 22B, had a higher concentration of $NO_2$ than that emitted from engine 15, i.e., at 22A. The $NO_2$ molecule is generally considered to be a more reactive species than the NO molecule. Further, $NO_2$ is more polar and thus potentially more adsorbable on catalyst surfaces than NO. Thus, exhaust gases having a NOx composition with a higher $NO_2$/NOx ratio may exhibit enhanced NOx reduction activity in the SCR reaction. The $NO_2$/NOx ratios for the steady state test conditions described above at the various sampling points (shown in FIG. 1) are given in Table 3 below:

TABLE 3

$NO_2$/NOx Ratios

| Load | Temp | Engine-Out NOx (ppm) | Engine-Out $NO_2$/NOx Ratio 22A | CSF-Out $NO_2$/NOx Ratio 22B | ZNX-Out (NSR >0.8) $NO_2$/NOx Ratio 22C, 22D |
|---|---|---|---|---|---|
| 100% | 468° C. | 770 | 0.3% | 12.7% | 0.0% |
| 60% | 345° C. | 420 | 1.2% | 45.4% | 0.0% |
| 14% | 200° C. | 214 | 4.6% | 28.2% | 0.0% |

The enhanced levels of CSF-out $NO_2$ can be seen in Table 3 as a significant increases in the $NO_2$/NOx ratio for each of the steady state test conditions. Furthermore, no $NO_2$ could be found in the SCR catalyst-out sampling position. Thus, 100% of the $NO_2$ was converted over SCR catalyst 14.

The preferred embodiment uses a solution of urea in water injected into the exhaust. FIG. 1 is schematically reproduced in FIG. 14A in its commercially implemented sense and reference numerals used in FIG. 1 will apply to FIG. 14A where possible. As is well known, various arrangement are used in which aqueous urea shown on one line 70 with air on another line 71 are mixed in various nozzle configurations shown as mixing station 72 to pulse or meter (schematically indicated by valve 74) a precise amount (stated as an NSR value) of ammonia which is injected as a spray from a nozzle into the exhaust stream. Valve 74, in turn, is controlled or regulated by a computer (not shown) typically the engine's ECM (electronic command module) which interpolates sensor (not shown) readings of the exhaust gases to establish a reductant flow sufficient to match a desired NSR value. It is known that an aqueous urea solution tends to lower the exhaust temperature which is not desirable because of the SCR active window temperature range. The data has shown, however, that the temperature at which the SCR is catalytically active is lowered (at space velocities indicated) if the inventive arrangement is used. Thus, the invention can function with an aqueous urea solution in the preferred embodiment because the adverse effects of dropping exhaust gas temperature is not as harmful to the reduction system as it would otherwise be, i.e., an arrangement without CSF 12. However, the invention is not limited to urea mixed with water and contemplates use of a solid ammonia reductant because it is (among other reasons) not desirable to lower exhaust gas temperature even with the invention. Accordingly, urea prills could be injected or supplied on one line 70 with heat (optionally by means of a carrier gas, i.e., exhaust gas) on another line 71 to the mixing station 72. The ammonia in gaseous form is injected by pulse metering through a valve such as valve 74 to the exhaust stream in FIG. 14A. As is well known, a gasified solid reductant does not reduce exhaust gas temperature. Also, any ammonia precursor can be used in the preferred embodiment.

The invention has been demonstrated to work with nitrogen containing reductants and it is noted that an SCR catalyst is generally a term associated with nitrogen reductants. The inventors believe that the invention may have application to reductants other than nitrogen reductants although they have not tested the invention as of the date hereof to verify their belief. In any event, the term "SCR" catalyst will be used herein in a broader sense to mean a selective catalytic reduction in which a catalyzed reaction of nitrogen oxides with a reductant occurs to reduce the nitrogen oxides. "Reductant" or "reducing agent" is also broadly used herein to mean any chemical or compound tending to reduce NOx at elevated temperature. In the preferred embodiment, the reducing agent is ammonia, specifically an ammonia precursor, i.e., urea and the SCR is a nitrogen reductant SCR. However, in accordance with a broader scope of the invention, the reductant could include fuel, particularly diesel fuel and fractions thereof as well any hydrocarbon and oxygenated hydrocarbons collectively referred to as an HC reductant. Therefore, in FIG. 14A, fuel oil on one line 70, could be supplied and air, optionally, on the other line 71, and the fuel/air mixture cracked in mixing station 72 (to produce the reductant) and pulsed metered through valve 74 to the SCR (as broadly defined). Alternatively, the reductant (fuel oil) can be metered in liquid form, i.e., sprayed, into the exhaust gas.

Figure 14B:
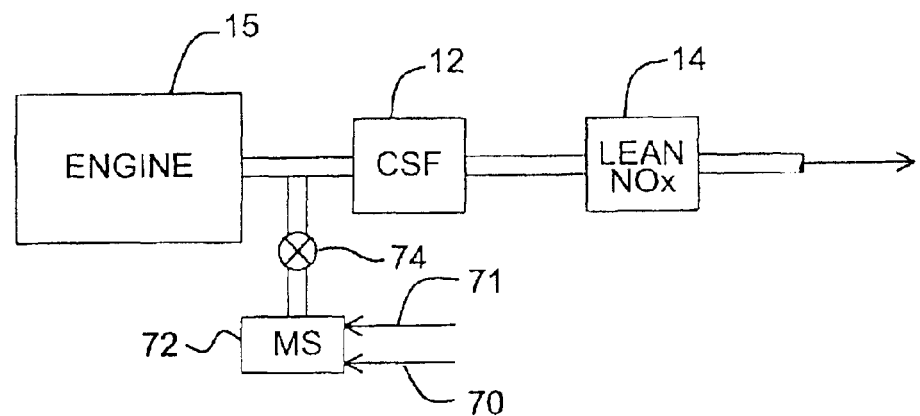
FIGS. 14B and 14C are schematic depictions of possible alternative configurations of the system of the present invention; and, FIGS. 15 and 16 are schematic end view and section views, respectively, of a catalyzed wall flow filter used in the invention.
Figure 14C:
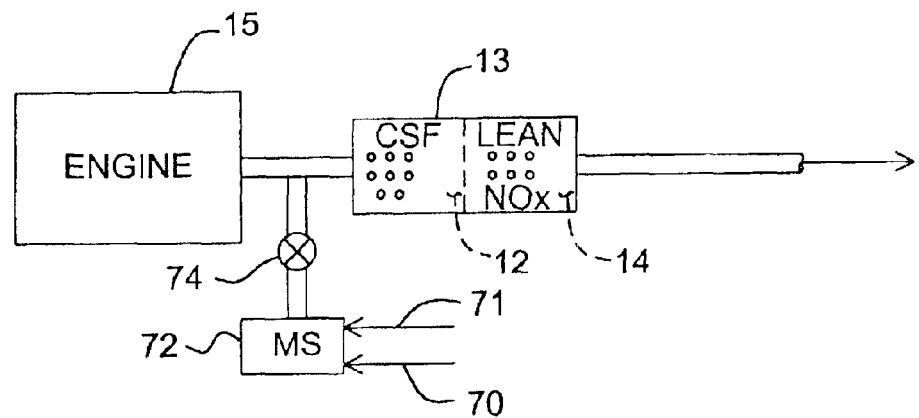

Definition notwithstanding, when a hydrocarbon reductant is used to reduce NOx over a catalyst, the catalyst is typically referred to as a lean NOx catalyst and lean NOx catalysts are typically classified as either a low temperature NOx catalyst or a high temperature NOx catalyst. The low temperature lean NOx catalyst is platinum based (Pt-based) and does not have to have a zeolite present to be active, but Pt/zeolite catalysts are better and appear to have better selectivity against formation of $N_2O$ as a by-product than other catalysts, such as Pt/alumina catalysts. Generally a low temperature lean NOx catalyst has catalytically active temperature ranges of about 180 to 350° C. with highest efficiencies at a temperature of about 250° C. High temperature lean NOx catalysts have base metal/zeolite compositions, for example Cu/ZSM-5. High temperature NOx catalysts have a lower temperature range of about 300–350° C. with highest efficiency occurring around 400EC. The broader scope of this invention uses either high or low temperature lean NOx catalysts with an HC reductant, as described for example in FIG. 14A. Because of the potential for ammonia to form NOx, it is considered desirable to introduce the ammonia to the exhaust gas at the in-between position shown in FIG. 14A. However, an HC reductant does not raise the same concerns so that an HC reductant can be introduced into the exhaust gas as shown in FIG. 14B. Further, it is therefore possible to construct a single catalyst brick 13 which has a catalyzed soot filter at its entrance portion and a lean NOx catalyst extending over its exit portion as shown in FIG. 14C with the HC reductant introduced to the exhaust gases at the inlet of the combined catalyst. The catalysts could, of course, be separate and combined in a single cover. Again, as of the date of this invention, specific tests using lean NOx catalysts have not been performed. However, based on observations during testing of the preferred embodiment using ammonia reductant, it is believed that comparable results may be obtained using lean NOx catalysts with an HC reductant.

Figure 15:
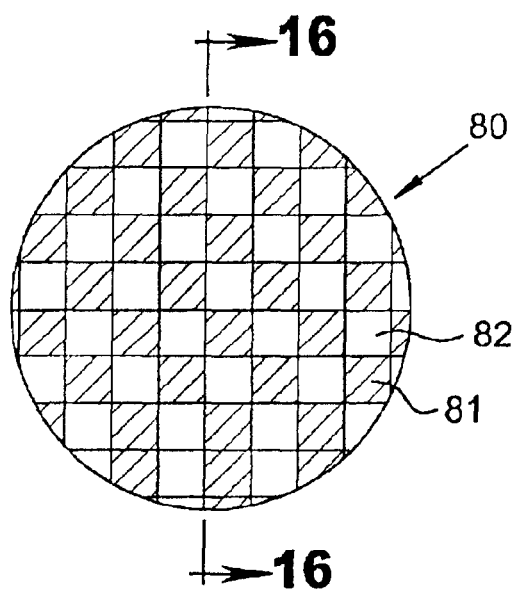
Figure 16:
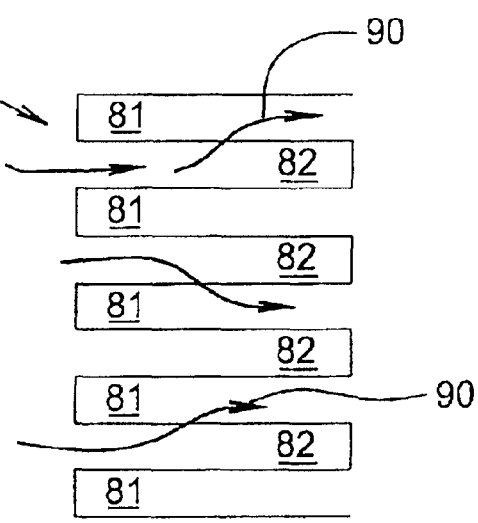

The reason why the CSF and nitrogen reductant SCR embodiment is preferred can be demonstrated by reference to FIGS. 15 and 16 which schematically show end and side views, respectively, of a wall flow filter 80. The porous or gas permeable walls of wall flow filter 80 form channels with the interior surface of any given wall forming a portion of a channel and the exterior surface of the same wall forming a portion of an adjacent channel. Channels in the wall flow filter have the conventional checkerboard pattern (FIG. 15) which have alternating closed 81 and open 82 channels to the entry side of the exhaust (FIG. 16). All channels are catalyzed as discussed above for purposes of explanation. (Note that it may be possible to selectively coat portions of channels 81, 82. Again, most of the NOx in the exhaust gas produced by diesel engine 15 is NO as discussed above. While the composition of the exhaust gases can be varied by any number of factors such as by fuel choice, fueling, combustion chamber design, etc., typically NO will comprise at least 50% of the NOx discharged from the engine's combustion chamber.) Nitric oxide, NO, and soot enter open channels 82. It is believed NO oxidizes by reaction with the catalyzed surface on inlet channel 82 and changes to $NO_2$. As is well known, soot gets trapped by wall flow filter walls which allow exhaust gas to pass therethrough as shown by arrows 90. However, $NO_2$ formed in inlet channel 82 reacts with the soot trapped on each inlet channel's walls and reduces to NO. Reaction by $NO_2$ with soot is beneficial to the filter (maintains cleaner filter, less backpressure, etc.) and to the emission process. ($NO_2$ is highly reactive with carbonaceous material.) Nitric oxide, NO entering closed channel 81 now reacts with catalyst on the wall surfaces of closed channel 81 and oxidizes to $NO_2$. The $NO_2$ produces benefits allowing enhanced operation of the nitrogen reductant SCR as described above. This is a distinction over the prior art arrangements discussed above which used a DOC (diesel oxidation catalyst), either by itself upstream of the SCR or upstream of a particulate filter and the SCR. In these arrangements, the DOC is exposed to and possibly subject to clogging from soot. It is of little benefit because $NO_2$ produced in the DOC reduces to NO upon contact with soot in the particulate filter. Also, a DOC upstream of the SCR and downstream of a particulate filter has little benefit if the catalyzed particulate filter is properly sized. The costs of such emission arrangement is needlessly increased because of the requirement of the DOC.

The composition of CSF 12 in the preferred embodiment has been described above. As schematically indicated in FIGS. 15 and 16, the catalytic material is deposited on a carrier of a type usually referred to as honeycombed or a monolith carriers comprising a unitary body, generally cylindrical in configuration, having a plurality of fine, substantially parallel gas flow passages or channels extending therethrough. When the channels are open-ended, the carrier is referred to as a "flow through" carrier. When each channel is blocked at one end of the carrier body, with alternate channels blocked at opposite end-faces the carrier is referred to as a wall-flow carrier (or filter). The wall-flow carrier as well as the catalytic material deposited thereon is porous so that exhaust gases can flow through the walls of the carrier (and without creating excessive backpressure on the engine). The monolithic carrier body is preferably comprised of ceramic-like materials such as cordierite, %-alumina, silicon nitride, zirconia, mullite, spodumene, alumina-silica-magnesia or zirconium silicate. The catalyst coated or dipped or sprayed onto the carrier, (other than the composition) specifically mentioned above may be of a composition such as disclosed in assignee's U.S. Pat. No. 5,100,632 to Dettling et al., issued Mar. 31, 1992, entitled "Catalyzed Diesel Exhaust Particulate Filter" or even the catalyst composition utilizing zeolites disclosed in assignee's U.S. Pat. No. 5,804,155 to Farrauto et al., issued Sep. 8, 1998, entitled "Basic Zeolites as Hydrocarbon Traps for Diesel Oxidation Catalysts". Both the '632 and '155 patents are incorporated by reference herein for their disclosure of the catalyst compositions applied to the carrier of the CSF used in this invention. As noted above, the diesel exhaust is a heterogeneous material which contains pollutants such as carbon monoxide (CO), unburned hydrocarbons (HC), nitrogen oxides (NOx) as well as soot particles. Soot particles compose both a dry, solid carbonous fraction and a soluble organic fraction. The soluble organic fraction is sometimes referred to as a volatile organic fraction (VOF or SOF)

which may exist in diesel exhaust either as a vapor or as aerosol (fine droplets of liquid condensate) depending on the temperature of the exhaust gas. The catalyst on the CSF oxidizes the VOF retarding or minimizing CSF blockage or inhibiting decrease in permeability of the wall-flow filter's channels. The soot filter also oxidizes HC and CO to convert these pollutants into "benign" emissions. The gases produced from the oxidation of VOF are generally non-polluting and do not materially interfere with or block the active sites of the SCR catalyst. As noted, the CSF catalyst also oxidizes nitric oxide, NO, to $NO_2$ which on contact with VOF readily reduces to NO and is thus beneficial to the life of the CSF catalyst. Once the NO passes through the channel wall it again contacts the catalyst and oxidizes to the $NO_2$ state which is believed beneficial to the SCR catalyst reduction process for reasons noted.

In the preferred embodiment discussed above, a high loading of the precious metal coating (platinum group metal which is mixed with an alkaline earth metal oxide such as magnesium oxide) was used in the experiments, i.e., 75 g/ft$^3$. As discussed in the Background, the invention has application to diesel engines and diesel engines operate at lean fueling conditions. As a matter of definition, lean fueling condition means there is sufficient oxygen mixed with fuel to produce at least stoichiometric combustion of the fuel. Because excess oxygen is usually present, generally the HC and CO emissions from a diesel engine are less than those produced by a gasoline powered engine which typically cycles between rich and lean conditions and uses a TWC catalyst (three way catalyst). While the HC and CO emissions may be reduced in quantity in a diesel engine, considering that the invention uses the CSF as the primary source of converting HC and CO emissions to "benign" emissions and increases the $NO_2$ to a level having a noticeable affect on the ability of the SCR to reduce NOx, a high loading of precious metal coating on the CSF is desired, preferably in the range of at least 50 g/ft$^3$ and not less than about 25 g/ft$^3$. In applications having a DOC downstream of the SCR sized to convert reductant slip (ammonia slip), improved performance of the SCR is expected to occur with lesser concentrations of precious metal coating. In fact, improved performance of the SCR could occur if the precious metal, i.e., platinum concentrations are as low as 5 g/ft$^3$. NOx reduction will improve as the concentration of platinum increases on the catalyst substrate. The optimum precious metal concentration, however, is a function of a number of factors including the fuel composition, the engine design, engine operation, emission regulations, etc.

The invention has been described with reference to the assignee's ZNX SCR catalyst which has enjoyed commercial success for NOx reduction at gas temperatures occurring within its temperature window whereat the SCR catalyst is catalytically active for space velocities (flow rate of exhaust gas through the SCR catalyst) normally produced by mobile diesel engines. Other nitrogen reductant SCR catalysts compositions such as are disclosed in assignee's U.S. Pat. No. 4,961,917 to Byrne, issued Oct. 9, 1990, entitled "Method for Reduction of Nitrogen Oxides with Ammonia using Promoted Zeolite Catalysts" or the staged catalyst composition disclosed in assignee's U.S. Pat. No. 5,516,497 to Speronello et al., issued May 14, 1996, entitled "Staged Metal-Promoted Zeolite Catalysts and Method for Catalytic Reduction of Nitrogen Oxides Using the Same", may be employed. The '917 and '497 patents are incorporated herein by reference for their disclosure of SCR compositions. Generally, the references show a catalyst composition of zeolite, a promoter selected from the group consisting of iron and copper and a refractory binder. This is the preferred composition of the SCR catalyst and the ZNX SCR catalyst composition disclosed above falls within this general classification. However, a Vanadium-Titantium catalyst may also be acceptable and reference for a typical composition of such catalyst may be found in U.S. Pat. No. 4,833,113, issued May 23, 1989 to Imanari et al., entitled "Denitration Catalyst for Reducing Nitrogen Oxides in Exhaust Gas", also incorporated by reference herein.

As indicated above, light diesel engines have lower exhaust gas operating temperature ranges than heavy duty diesel engines. As a matter of distinction or characterization and generally speaking, the lower normal operating temperature range of light duty diesel engines (i.e., diesel engines on autos, SUVs, pick-up trucks) produce exhaust gases in the temperature range of 150–250° C. in contrast to the lower normal operating temperature range of heavy duty diesel engines in vehicles such as trucks which may be in the range of 235–500° C. Peak temperatures are considerably higher. As shown and for the same space velocity, the ZNX SCR catalyst with the upstream CSF catalyst becomes catalytically active at lower temperatures than those temperatures at which the ZNX SCR catalyst would become catalytically active if directly exposed to the combustion gases produced in the combustion chambers of engine 15 (i.e., the exhaust gases). Any SCR catalyst using a nitrogen reductant will have a lower catalytically active temperature (at the same space velocity) when used in the arrangement of the invention. Further, the tests show that the reduction in the catalytically active temperature of the ZNX catalyst was not accompanied with any noticeable reduction in the efficiency of the ZNX SCR catalyst. Thus, the invention has specific application to light duty diesel engine applications.

In a specific embodiment of the present invention there is a wall-flow type catalyzed soot filter adjacent to the diesel engine. A valve is downstream of said soot filter's exit in fluid communication with a nitrogen reductant and with said exhaust gases after exiting said soot filter. There is a means for regulating said valve to control the quantity of said nitrogen reductant admitted to said exhaust gases. A nitrogen reductant SCR catalyst is downstream of the valve and said soot filter. The SCR catalyst has a set temperature at which said SCR catalyst becomes catalytically active for a set space velocity if said exhaust gases pass through said SCR catalyst with a set quantity of reductant immediately upon exit from said engine that is higher than the temperature at which said SCR catalyst becomes catalytically active when said exhaust gases pass through said SCR catalyst at said set space velocity with said set quantity of reductant after passing through said soot filter.

The invention has been described with reference to a preferred embodiment. Obviously, modifications and alterations will occur to others upon reading and understanding the detailed description of the invention. It is intended to include all such modifications insofar as they come within the scope of the present invention.

Having thus defined the invention, it is claimed:

1. An emission purification system for treating exhaust gases produced by a vehicle powered by a diesel engine comprising:

a) a catalyzed soot filter adjacent and in direct fluid communication with said engine without intervening catalysts therebetween, said soot filter of the wall-flow type having gas permeable walls formed into a plurality of axially extending channels, each channel having one end plugged with any pair of adjacent channels plugged at opposite ends thereof, said exhaust gases passing through said channel walls as said gases travel from an entrance to an exit of said soot filter;

b) a valve downstream of said soot filter's exit in fluid communication with a nitrogen reductant and with said exhaust gases after exiting said soot filter;

c) means for regulating said valve to control the quantity of said nitrogen reductant admitted to said exhaust gases; and, d) a nitrogen reductant SCR catalyst downstream of said valve and said soot filter in direct fluid communication with said soot filter, said SCR catalyst having a set temperature at which said SCR catalyst becomes catalytically active for a set space velocity if said exhaust gases pass through said SCR catalyst with a set quantity of reductant immediately upon exit from said engine that is higher than the temperature at which said SCR catalyst becomes catalytically active when said exhaust gases pass through said SCR catalyst at said set space velocity with said set quantity of reductant after passing through said soot filter.

2. The system of claim 1 wherein said soot filter has a catalyzed surface containing at least 25 g/ft$^3$ of a precious metal coating.

3. The system of claim 1 wherein said SCR catalyst has a catalyst composition of zeolite, a promoter selected from the group consisting of iron and copper and a refractory binder.

4. The system of claim 3 wherein said nitrogen reductant is ammonia and said quantity of said reductant metered to said exhaust gases does not exceed a normalized stoichiometric ratio of 1.5.

5. The system of claim 4 wherein said catalytically active temperature of said SCR catalyst downstream from said soot filter is less than about 200° C.

6. A method for treating exhaust gas emissions produced by a vehicle powered by a diesel engine including light duty diesel engines, said exhaust gases including nitrogen oxides, NOx, with nitric oxide (NO) comprising at least 50% of the composition of said NOx, and soot containing a VOF, said method comprising the steps of:

a) providing a catalyzed soot filter downstream of said engine, said soot filter comprising gas porous walls catalyzed on both sides thereof formed into axially extending channels, each channel having a plug at one end and open at its opposite end with any pair of adjacent channels having plugs at opposite channel ends;

b) flowing said exhaust gas produced by said engine without any catalyzing device altering the composition of said exhaust gas into channels having open ends confronting said engine which define open end channels, oxidizing said NO through contact with said catalyzed wall surfaces of said open ended channels to produce $NO_2$ and reacting said $NO_2$ with said soot in said open ended channels and is reduced from SCR catalyst said $NO_2$ to said NO;

c) flowing said NO through said walls into channels having plug ends confronting said engine which define closed end channels, and oxidizing said NO by contact with said catalyzed wall surfaces on said closed end channels to produce $NO_2$, said exhaust gases having a higher concentration of $NO_2$ exiting said soot filter than entering said soot filter;

d) injecting a set amount of a nitrogen reductant into said exhaust stream downstream of said soot filter;

e) providing a SCR catalyst on a monolith; and, f) passing said gases into which said reductant has been injected over and in contact with said SCR catalyst whereby said NOx is reduced.

7. The method of claim 6 wherein said soot filter has a catalyzed surface containing at least 25 g/ft$^3$ of a platinum metal group.

8. The method of claim 7 wherein said SCR catalyst has a catalyst composition of zeolite, a promoter selected from the group consisting of iron and copper and a refractory binder.

9. The method of claim 8 wherein said nitrogen reductant is ammonia and said quantity of said reductant metered to said exhaust gases does not exceed a normalized stoichiometric ratio of 1.5.

* * * * *